US010482511B1

(12) United States Patent
Artman et al.

(10) Patent No.: US 10,482,511 B1
(45) Date of Patent: Nov. 19, 2019

(54) EMPLOYEE PROFILE FOR CUSTOMER ASSIGNMENT, ANALYTICS AND PAYMENTS

(71) Applicant: GROUPON, INC., Chicago, IL (US)

(72) Inventors: Tuomas Artman, San Francisco, CA (US); Jyri Engestrom, San Francisco, CA (US); Ulf Schwekendiek, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 1511 days.

(21) Appl. No.: 13/797,264

(22) Filed: Mar. 12, 2013

(51) Int. Cl.
*G06Q 10/00* (2012.01)
*G06Q 30/06* (2012.01)

(52) U.S. Cl.
CPC ................ *G06Q 30/0601* (2013.01)

(58) Field of Classification Search
CPC .................................................. G06Q 30/0601
USPC .............................................. 705/7.11–7.42
See application file for complete search history.

(56) References Cited

U.S. PATENT DOCUMENTS

| 2,153,480 | A | 4/1939 | Pierce | |
|---|---|---|---|---|
| 6,208,468 | B1 | 3/2001 | Togino et al. | |
| 6,327,578 | B1 | 12/2001 | Linehan | |
| 6,764,013 | B2* | 7/2004 | Ben-Aissa | G06Q 20/341 235/385 |
| 6,812,851 | B1 | 11/2004 | Dukach et al. | |
| 6,873,974 | B1* | 3/2005 | Schutzer | G06Q 20/10 235/379 |
| 7,177,847 | B2 | 2/2007 | Atkinson et al. | |
| 7,229,013 | B2* | 6/2007 | Ben-Aissa | G06K 9/00087 235/380 |
| 7,609,821 | B2 | 10/2009 | Delaney et al. | |
| 7,774,231 | B2 | 8/2010 | Pond et al. | |
| 7,891,560 | B2 | 2/2011 | Hammad | |
| 7,934,986 | B2 | 5/2011 | Kane et al. | |

(Continued)

FOREIGN PATENT DOCUMENTS

| WO | WO 11/112752 A1 | 9/2011 |
|---|---|---|
| WO | WO 12/106757 A1 | 8/2012 |

(Continued)

OTHER PUBLICATIONS

PCT International Search Report and Written Opinion of the International Searching Authority for application PCT/US2013/033145 dated Jun. 21, 2013.

(Continued)

*Primary Examiner* — Jonathan G Sterrett
(74) *Attorney, Agent, or Firm* — Alston & Bird LLP

(57) ABSTRACT

Systems and related methods facilitating interactions between a merchant device, a central system and a consumer device are discussed herein. Wallet identifying data may be used to secure messages between the consumer device and the merchant device over a wireless link. For example, the merchant device may include circuitry configured to wirelessly receive the wallet identifying data from a consumer device and to transmit the wallet identifying data to the central system. In response, consumer identifying data associated with the wallet identifying data may be received by the merchant device from the central system. In some embodiments, employee identifying data that identifies an employee may be associated with the consumer identifying data to facilitate consumer assistance and employee payment.

18 Claims, 16 Drawing Sheets

(56) References Cited

U.S. PATENT DOCUMENTS

| | | |
|---|---|---|
| 8,045,967 B2 | 10/2011 | Lovegreen et al. |
| 8,131,619 B1 | 3/2012 | Veselka |
| 8,224,700 B2 | 7/2012 | Silver |
| 8,229,853 B2 | 7/2012 | Dispensa et al. |
| 8,284,061 B1 | 10/2012 | Dione |
| 8,370,264 B1* | 2/2013 | Wei .................. G06Q 20/12 705/65 |
| 9,117,231 B2 | 8/2015 | Rodgers et al. |
| 2002/0017561 A1* | 2/2002 | Tomoike ............ G06Q 20/04 235/383 |
| 2002/0029342 A1 | 3/2002 | Keech |
| 2002/0072921 A1* | 6/2002 | Boland ............. G06Q 10/063 709/206 |
| 2002/0073044 A1 | 6/2002 | Singhai |
| 2002/0077993 A1* | 6/2002 | Immonen ........... G06Q 20/04 705/77 |
| 2002/0107610 A1 | 8/2002 | Kaehler |
| 2002/0107791 A1* | 8/2002 | Nobrega ............ G06Q 20/02 705/39 |
| 2002/0142753 A1 | 10/2002 | Pecen |
| 2002/0151313 A1 | 10/2002 | Stead |
| 2003/0037113 A1* | 2/2003 | Petrovykh .......... H04L 12/58 709/205 |
| 2003/0172036 A1 | 9/2003 | Feigenbaum |
| 2003/0208409 A1 | 11/2003 | Mault |
| 2004/0030601 A1* | 2/2004 | Pond ................. B67D 7/145 705/16 |
| 2004/0116074 A1 | 6/2004 | Fujii et al. |
| 2004/0143473 A1* | 7/2004 | Tivey ................ G06Q 30/02 705/1.1 |
| 2005/0043996 A1 | 2/2005 | Silver |
| 2005/0187873 A1* | 8/2005 | Labrou ............... G06Q 20/02 705/40 |
| 2005/0273345 A1 | 12/2005 | Castillejo Romero |
| 2006/0085267 A1 | 4/2006 | Lovegreen et al. |
| 2006/0156060 A1 | 7/2006 | Dua |
| 2006/0178943 A1 | 8/2006 | Rollinson |
| 2007/0012763 A1 | 1/2007 | DeWitt |
| 2007/0250355 A1 | 10/2007 | Leet et al. |
| 2007/0280269 A1 | 12/2007 | Rosenberg |
| 2007/0282739 A1 | 12/2007 | Thomsen |
| 2008/0010193 A1 | 1/2008 | Rackley, III et al. |
| 2008/0051122 A1 | 2/2008 | Fisher |
| 2008/0065374 A1 | 3/2008 | Coffing |
| 2008/0065490 A1 | 3/2008 | Novick et al. |
| 2008/0097851 A1 | 4/2008 | Bemmel |
| 2008/0143487 A1 | 6/2008 | Hulvey et al. |
| 2008/0147546 A1* | 6/2008 | Weichselbaumer ........................ G06Q 20/105 705/41 |
| 2008/0162318 A1 | 7/2008 | Butler et al. |
| 2008/0182616 A1 | 7/2008 | Connors |
| 2008/0208744 A1 | 8/2008 | Arthur |
| 2008/0222004 A1 | 9/2008 | Pollock et al. |
| 2009/0037286 A1 | 2/2009 | Foster |
| 2009/0063312 A1 | 3/2009 | Hurst |
| 2009/0070263 A1 | 3/2009 | Davis et al. |
| 2009/0076896 A1* | 3/2009 | DeWitt ............. G06Q 30/02 705/14.17 |
| 2009/0192935 A1 | 7/2009 | Griffin et al. |
| 2010/0252624 A1 | 1/2010 | Van de Velde |
| 2010/0082481 A1 | 4/2010 | Lin et al. |
| 2010/0094701 A1 | 4/2010 | Ghosh et al. |
| 2010/0145861 A1 | 6/2010 | Law et al. |
| 2010/0250549 A1 | 9/2010 | Muller et al. |
| 2010/0276484 A1 | 11/2010 | Banerjee et al. |
| 2010/0320266 A1 | 12/2010 | White |
| 2010/0325047 A1 | 12/2010 | Carlson et al. |
| 2011/0029362 A1 | 2/2011 | Roeding et al. |
| 2011/0029370 A1 | 2/2011 | Roeding et al. |
| 2011/0055005 A1 | 3/2011 | Lang |
| 2011/0088087 A1 | 4/2011 | Kalbratt |
| 2011/0173096 A1 | 7/2011 | Bui |
| 2011/0191196 A1 | 8/2011 | Orr et al. |
| 2011/0218911 A1* | 9/2011 | Spodak .............. G06Q 20/105 705/41 |
| 2011/0238499 A1 | 9/2011 | Blackhurst et al. |
| 2011/0313867 A9 | 12/2011 | Silver |
| 2011/0320293 A1* | 12/2011 | Khan ................ G06Q 20/0457 705/16 |
| 2012/0029990 A1 | 2/2012 | Fisher |
| 2012/0030066 A1 | 2/2012 | Stringfellow et al. |
| 2012/0036042 A1* | 2/2012 | Graylin ............... G06Q 20/32 705/26.41 |
| 2012/0072311 A1 | 3/2012 | Khan et al. |
| 2012/0088487 A1* | 4/2012 | Khan ................. H04W 4/001 455/418 |
| 2012/0095852 A1* | 4/2012 | Bauer ................ G06Q 20/105 705/16 |
| 2012/0136754 A1 | 5/2012 | Underwood et al. |
| 2012/0150669 A1 | 6/2012 | Langley |
| 2012/0158528 A1 | 6/2012 | Hsu et al. |
| 2012/0172062 A1 | 7/2012 | Altman |
| 2012/0179528 A1 | 7/2012 | Ortiz et al. |
| 2012/0209729 A1 | 8/2012 | Lovegreen |
| 2012/0239417 A1* | 9/2012 | Pourfallah .......... G06Q 10/00 705/2 |
| 2012/0239560 A1 | 9/2012 | Pourfallah et al. |
| 2012/0253913 A1 | 10/2012 | Richard |
| 2012/0254020 A1 | 10/2012 | Debow |
| 2012/0271697 A1* | 10/2012 | Gilman .............. G06Q 20/387 705/14.23 |
| 2012/0271759 A1 | 10/2012 | Lee |
| 2012/0290449 A1* | 11/2012 | Mullen .............. G06Q 10/00 705/27.2 |
| 2012/0310743 A1 | 12/2012 | Johri |
| 2012/0317628 A1 | 12/2012 | Yeager et al. |
| 2012/0323664 A1 | 12/2012 | Klems |
| 2012/0330769 A1* | 12/2012 | Arceo ................ G06Q 20/4014 705/21 |
| 2013/0024364 A1* | 1/2013 | Shrivastava ......... G06Q 20/38 705/39 |
| 2013/0046634 A1* | 2/2013 | Grigg ................ G06Q 30/00 705/14.58 |
| 2013/0073365 A1 | 3/2013 | McCarthy |
| 2013/0097031 A1 | 4/2013 | Royyuru et al. |
| 2013/0138518 A1 | 5/2013 | White et al. |
| 2013/0144731 A1* | 6/2013 | Baldwin ............ G06Q 20/20 705/17 |
| 2013/0151357 A1 | 6/2013 | Havas et al. |
| 2013/0159080 A1* | 6/2013 | Wu .................. G06Q 30/02 705/14.23 |
| 2013/0159119 A1 | 6/2013 | Henderson |
| 2013/0159181 A1* | 6/2013 | Hueck ............... G06Q 20/36 705/41 |
| 2013/0191174 A1 | 7/2013 | Zhou et al. |
| 2013/0191227 A1* | 7/2013 | Pasa ................. G06Q 20/3674 705/14.73 |
| 2014/0037193 A1 | 9/2013 | Smith |
| 2013/0282438 A1* | 10/2013 | Hunter .............. G01S 1/02 705/7.32 |
| 2013/0304642 A1 | 11/2013 | Campos |
| 2013/0317928 A1* | 11/2013 | Laracey ............ G06Q 20/363 705/21 |
| 2013/0339233 A1* | 12/2013 | Lee .................. G06Q 20/36 705/41 |
| 2013/0346302 A1 | 12/2013 | Purves et al. |
| 2014/0006182 A1 | 1/2014 | Wilson et al. |
| 2014/0006205 A1 | 1/2014 | Berry et al. |
| 2014/0032297 A1 | 1/2014 | Germann et al. |
| 2014/0058862 A1 | 2/2014 | Celkonas et al. |
| 2014/0058938 A1* | 2/2014 | McClung ........... G06Q 20/227 705/41 |
| 2014/0067677 A1 | 3/2014 | Ali |
| 2014/0074655 A1* | 3/2014 | Lim ................. G06Q 20/32 705/26.35 |
| 2014/0099981 A1 | 4/2014 | Horbal |
| 2014/0100973 A1 | 4/2014 | Brown et al. |
| 2014/0108108 A1 | 4/2014 | Artman et al. |
| 2014/0108247 A1 | 4/2014 | Artman et al. |

(56) References Cited

U.S. PATENT DOCUMENTS

| | | | |
|---|---|---|---|
| 2014/0114776 A1* | 4/2014 | Solanki | G06Q 30/06 705/15 |
| 2014/0143018 A1* | 5/2014 | Nies | G06Q 30/0201 705/7.32 |
| 2014/0229375 A1 | 8/2014 | Zaytzsev et al. | |
| 2014/0244354 A1* | 8/2014 | Seifert | G06Q 30/0202 705/7.31 |
| 2014/0310117 A1 | 10/2014 | Moshal et al. | |
| 2014/0344153 A1 | 11/2014 | Raj et al. | |
| 2015/0046276 A1 | 2/2015 | Artman et al. | |
| 2015/0095134 A1 | 4/2015 | Parker et al. | |
| 2015/0269557 A1 | 9/2015 | Artman et al. | |

FOREIGN PATENT DOCUMENTS

| | | |
|---|---|---|
| WO | WO 13/066910 A1 | 5/2013 |
| WO | WO 2013/066910 A1 | 5/2013 |
| WO | WO 14/062229 A1 | 4/2014 |
| WO | WO 14/062230 A1 | 4/2014 |
| WO | WO 14/124935 A2 | 8/2014 |
| WO | WO 14/164228 A1 | 10/2014 |
| WO | WO 2015/048476 A1 | 4/2015 |

OTHER PUBLICATIONS

PCT Written Opinion of the International Searching Authority for application PCT/US2013/033169 dated Jun. 10, 2013.
International Preliminary Report on Patentability for application PCT/US2013/033145 dated Apr. 21, 2015.
PCT International Preliminary Report on Patentability for application PCT/US2013/033169 dated Apr. 21, 2015.
PCT International Search Report and Written Opinion of the International Searching Authority for application PCT/US2014/015630 dated Dec. 8, 2014.
PCT International Search Report and Written Opinion of the International Searching Authority for application PCT/US2014/021387 dated Jul. 7, 2014.
PCT International Search Report for application PCT/US2013/033169 dated Jun. 10, 2013.
U.S. Appl. No. 13/764,753, Non-Final Office Action dated Mar. 26, 2015.
U.S. Appl. No. 13/794,529, Requirement for Restriction/Election dated May 15, 2014.
U.S. Appl. No. 13/794,529, Non-Final Office Action dated Feb. 25, 2015.
U.S. Appl. No. 13/794,529, Non-Final Office Action dated Aug. 6, 2014.
U.S. Appl. No. 13/801,520, Final Office Action dated Apr. 15, 2014.
U.S. Appl. No. 13/801,520, Non-Final Office Action dated Jul. 8, 2013.
U.S. Appl. No. 13/801,520, Non-Final Office Action dated Dec. 24, 2014.
U.S. Appl. No. 13/801,610, Final Office Action dated Feb. 5, 2014.
U.S. Appl. No. 13/801,610, Non-Final Office Action dated Jul. 12, 2013.
U.S. Appl. No. 13/875,019, Requirement for Restriction/Election dated Dec. 18, 2014.
U.S. Appl. No. 14/454,695, Non-Final Office Action dated Dec. 29, 2014.
PCT/US2013/033145, Mar. 20, 2013, WO 2014/062229, Pending.
PCT/US2013/033169, Mar. 20, 2013, WO 2014/062230, Pending.
PCT/US2014/015630, Feb. 10, 2014, WO 2014/124935, Pending.
PCT/US2014/021387, Mar. 6, 2014, WO 2014/164228, Pending.
PCT International Preliminary Report on Patentability for application PCT/US2013/033145 dated Apr. 21, 2015.
PCT International Search Report and Written Opinion of the International Searching Authority for application PCT/US2014/057762 dated Dec. 29, 2014.
U.S. Appl. No. 13/764,753, filed Feb. 11, 2013, Pending.
U.S. Appl. No. 13/794,529, filed Mar. 11, 2013, Pending.
U.S. Appl. No. 13/801,520, filed Mar. 13, 2013, Pending.
U.S. Appl. No. 13/801,610, filed Mar. 13, 2013, Pending.
PCT/US2013/033145, filed Mar. 20, 2013, WO 2014/062229, Pending.
PCT/US2013/033169, filed Mar. 20, 2013, WO 2014/062230, Pending.
U.S. Appl. No. 13/875,019, filed May 1, 2013, Pending.
PCT/US2014/015630, filed Feb. 10, 2014, WO 2014/124935, Pending.
PCT/US2014/021387, filed Mar. 6, 2014, WO 2014/164228, Pending.
U.S. Appl. No. 14/454,695, filed Aug. 7, 2014, Pending.
U.S. Appl. No. 14/050,311, filed Sep. 27, 2013, Pending.
U.S. Appl. No. 14/454,675, filed Aug. 7, 2014, Pending.
EP 13846999.4, filed Mar. 20, 2013, EP 2909799, Pending.

* cited by examiner

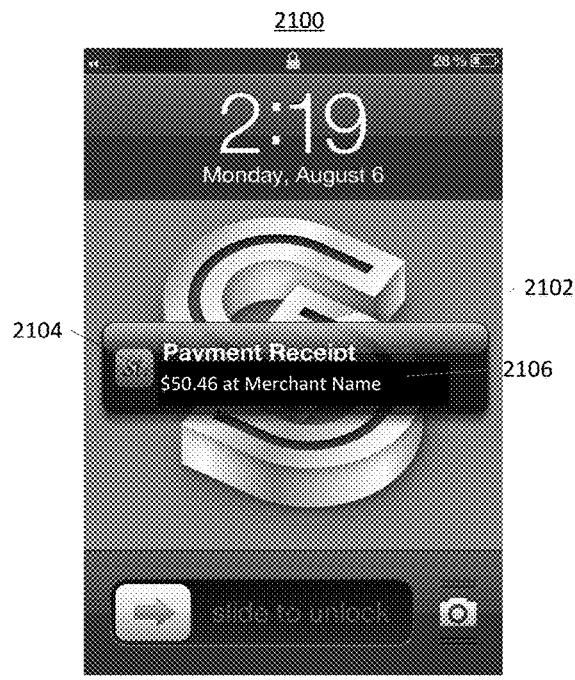

EMPLOYEE PROFILE FOR CUSTOMER ASSIGNMENT, ANALYTICS AND PAYMENTS

RELATED APPLICATIONS

This application incorporates by reference each of the following in their entirety: U.S. Provisional Patent Application No. 61/715,229, entitled "Peer-to-Peer Payment Processing," filed Oct. 17, 2012, U.S. Provisional Patent Application No. 61/715,230, entitled "Consumer Presence Based Deal Offers," filed Oct. 17, 2012, U.S. Provisional Patent Application No. 61/706,664, entitled "Online Ordering For In-Shop Service," filed Sep. 27, 2012, and U.S. patent application Ser. No. 13/764,753, entitled "Consumer Device Payment Token Management," filed Feb. 11, 2013.

FIELD

Embodiments of the invention relate, generally, to facilitating personal interactions between merchants and consumers.

BACKGROUND

For many businesses, different employees of a merchant are typically required to assist consumers in an interchangeable fashion. However, consumer loyalty and satisfaction can be improved when merchants are capable of providing a personal touch to interactions between their employees and consumers. In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve consumer interactions. More specifically, embodiments provided herein may include a system that may be implemented to provide merchants (e.g., those that have "brick-and-mortar" retail space and/or online ordering storefronts) a way to associate a particular employee with a particular consumer. In addition, some embodiments of the system may provide for facilitating payment from the consumer to the employee (e.g., as a tip) based on data sent (e.g., automatically, in some embodiments) by a consumer's machine and without the consumer having to present any other form of payment instrument, identification, or currency directly to the merchant.

In some embodiments, a merchant device may include processing circuitry configured to: wirelessly receive wallet identifying data from a consumer device; transmit the wallet identifying data to a central system; receive, from the central system, consumer identifying data associated with the wallet identifying data; and associate employee identifying data that identifies an employee with the consumer identifying data.

In some embodiments, the employee identifying data may further identify and an employee payment account configured to receive payments. As such, payments may be made directly from a consumer to an employee of a merchant.

For example, some embodiments of the processing circuitry of the merchant device may be further configured to: wirelessly receive, from the consumer device, consumer approval data indicating approval of a payment of an employee payment amount to the employee payment account; and send the consumer approval data to the central system. The payment approval data, in some embodiments, may be secured by the consumer device using the wallet identifying data. Furthermore, the consumer approval data may indicate approval of a payment of a merchant payment amount to a merchant payment account. For example, the merchant payment amount could be the cost of a product or service while the employee payment amount could be a tip.

In some embodiments, the processing circuitry of the merchant device may be configured to wirelessly send employee profile information of the employee associated with the consumer identifying data to the consumer device. For example, the employee profile information may be displayed by the consumer device to provide information about the employee to the consumer.

In some embodiments, the processing circuitry of the merchant device may be configured to associate the employee identifying data with the consumer identifying data based on various criteria, either alone or in combination, such as consumer preference data indicating a preference for the employee, consumer history data indicating prior interaction with the employee, service availability for a plurality of employees, determined location data based on a communication received from the consumer device indicating a location of the consumer device within a merchant shop, or the like. In some embodiments, some or all of data for the various criteria may be received at the merchant device from the central system.

In some embodiments, the processing circuitry of the merchant device may be configured to receive an employee evaluation of the employee from the consumer device. For example, the employee evaluation could be received after an interaction between the employee and the consumer. The processing circuitry may be further configured to associate the employee identifying data with the consumer identifying data based on one or more prior employee evaluations of the employee.

Some embodiments may provide for a consumer device configured to communicate with a merchant device and a central system. For example, the consumer device may include a display configured to present interactive displays, communications circuitry, and processing circuitry configured to: receive the wallet identifying data from the payment processing system, the wallet identifying data associated with consumer identifying data that identifies a consumer; wirelessly send the wallet identifying data to the merchant device; and wirelessly receive employee profile information of an employee associated with the consumer identifying data from the merchant device.

In some embodiments, the processing circuitry of the consumer device may be further configured to wirelessly send consumer approval data to the merchant device. The consumer approval data may indicate approval of a payment of an employee payment amount to an employee payment account. The employee payment account may be associated with the employee and configured to receive payments. Furthermore, some embodiments of the processing circuitry of the consumer device may be further configured to secure the consumer approval data with the wallet identifying data before wirelessly send consumer approval data to the merchant device.

Some embodiments may provide for a central system. The central system may include a networked device that includes communications circuitry and processing circuitry. The communications circuitry may be configured to facilitate communications with a consumer device and a merchant device. The processing circuitry may be configured to: send wallet identifying data to the consumer device, the wallet identifying data including a wallet identifying token and a private key, the wallet identifying data associated with consumer identifying data that identifies a consumer; receive the wallet identifying token sent to the consumer device from the merchant device; associate the consumer identifying data with employee identifying data that identifies an employee; and send the employee identifying data associated with the consumer identifying data to the merchant device.

In some embodiments, the processing circuitry of the central system may be further configured to: receive, from the merchant device, consumer approval data indicating approval of a payment of an employee payment amount to an employee payment account, wherein the employee payment account is identified by the employee identifying data and configured to receive payments; validate consumer approval data secured with the private key received from the merchant device; and process the payment after validating the consumer approval data received from the merchant device.

In some embodiments, the consumer approval data is secured with the private key by the consumer device. As such, the processing circuitry of the central system may be further configured to: determine the private key based on the wallet identifying token received from the merchant device; and recreate the consumer approval data using the private key.

In some embodiments, the processing circuitry of the central system may be further configured to: receive consumer data indicating a match between the consumer and the employee from the merchant device; and associate the consumer identifying data with the employee identifying data based on received consumer data.

Some embodiments may include one or more methods for performing the functionality described herein and/or non-transitory computer readable media storing instructions for performing the one or more methods that are executable by a processor. Other embodiments may include machines, such as an apparatus and/or system, configured to implement the methods and/or other functionality discussed herein. For example, the machine may include one or more processors and/or other machine components configured to implement the functionality discussed herein based on instructions and/or other data stored in memory, circuitry, and/or non-transitory computer readable media.

These characteristics as well as additional features, functions, and details of various corresponding and additional embodiments are described below.

BRIEF DESCRIPTION OF THE DRAWINGS

Figure 1A:
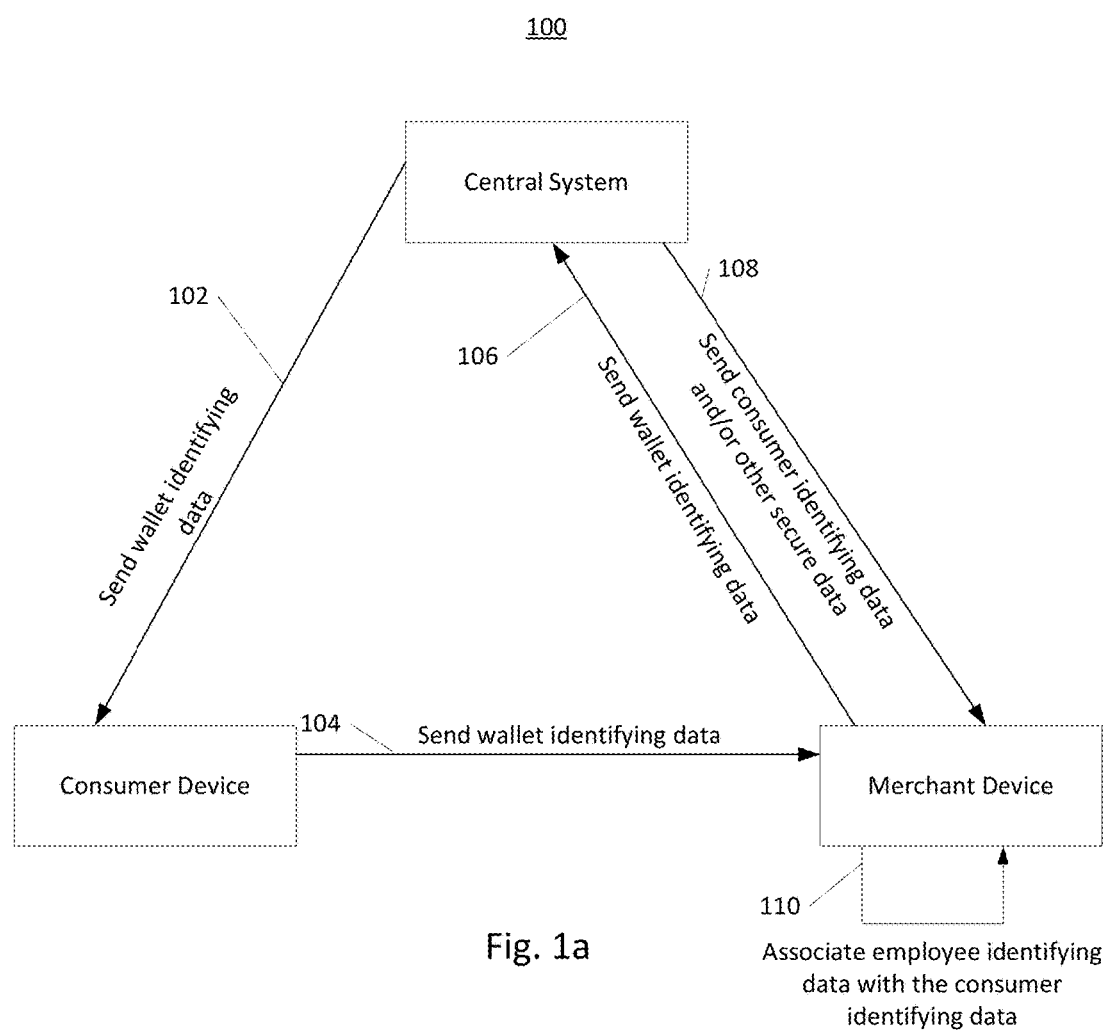
Figure 1B:
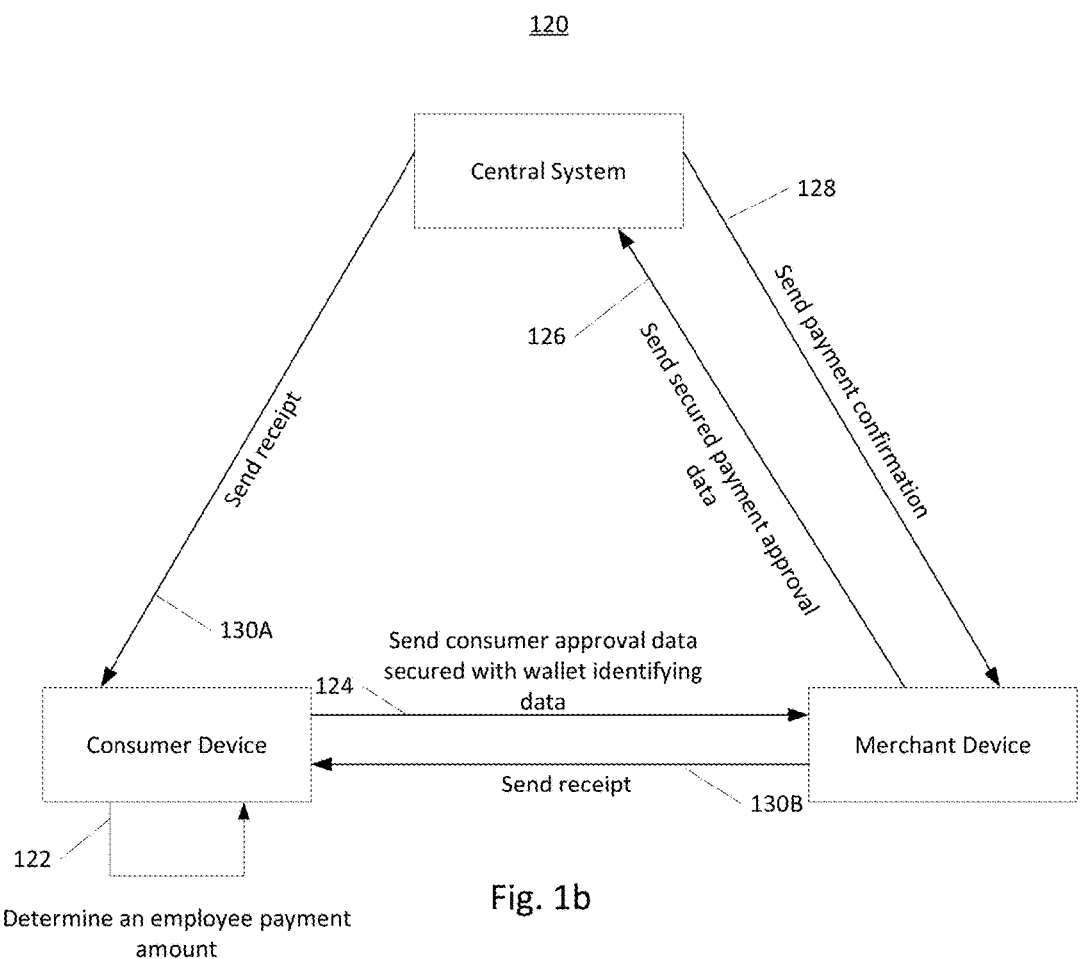
Figure 2A:
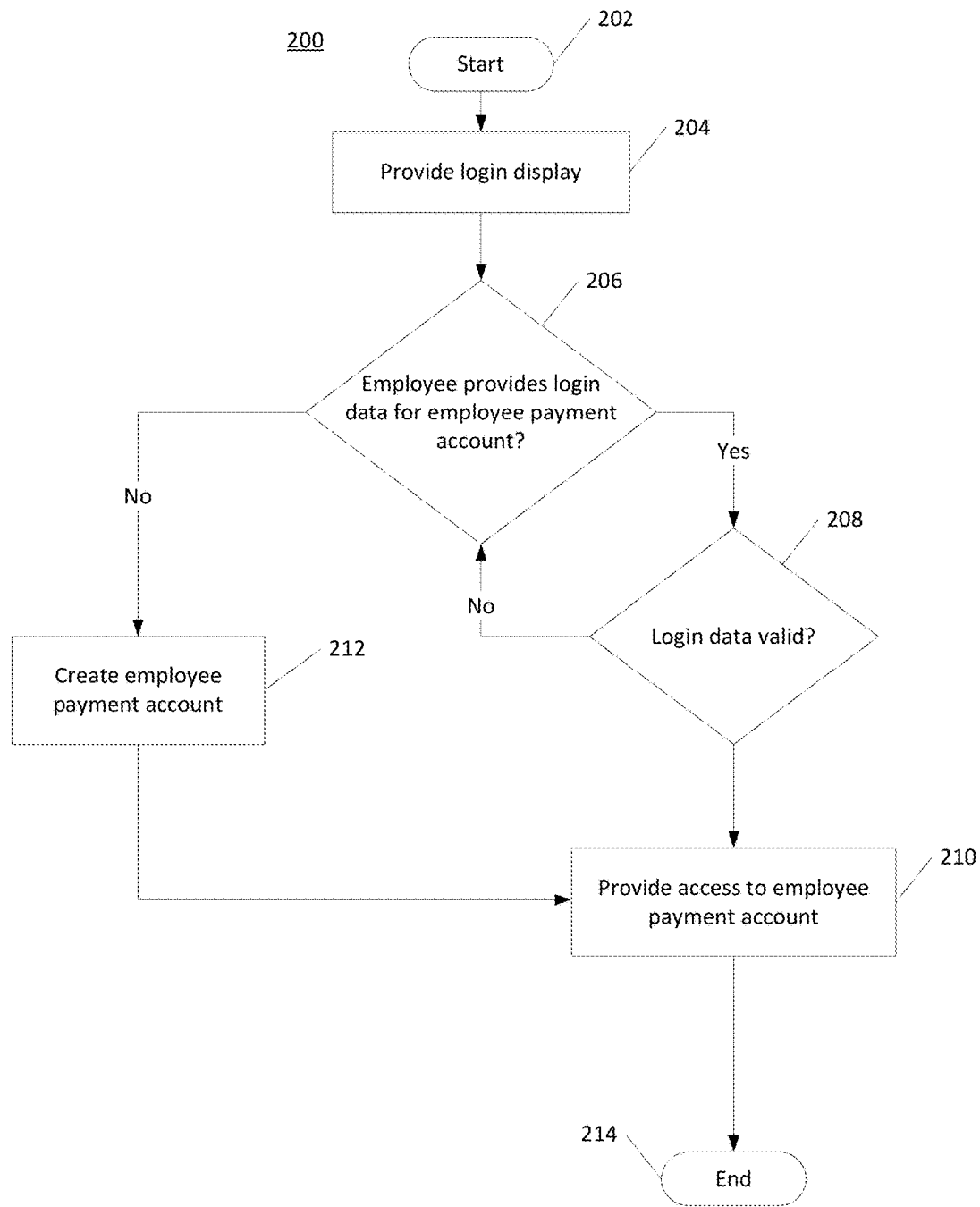
Figure 2B:
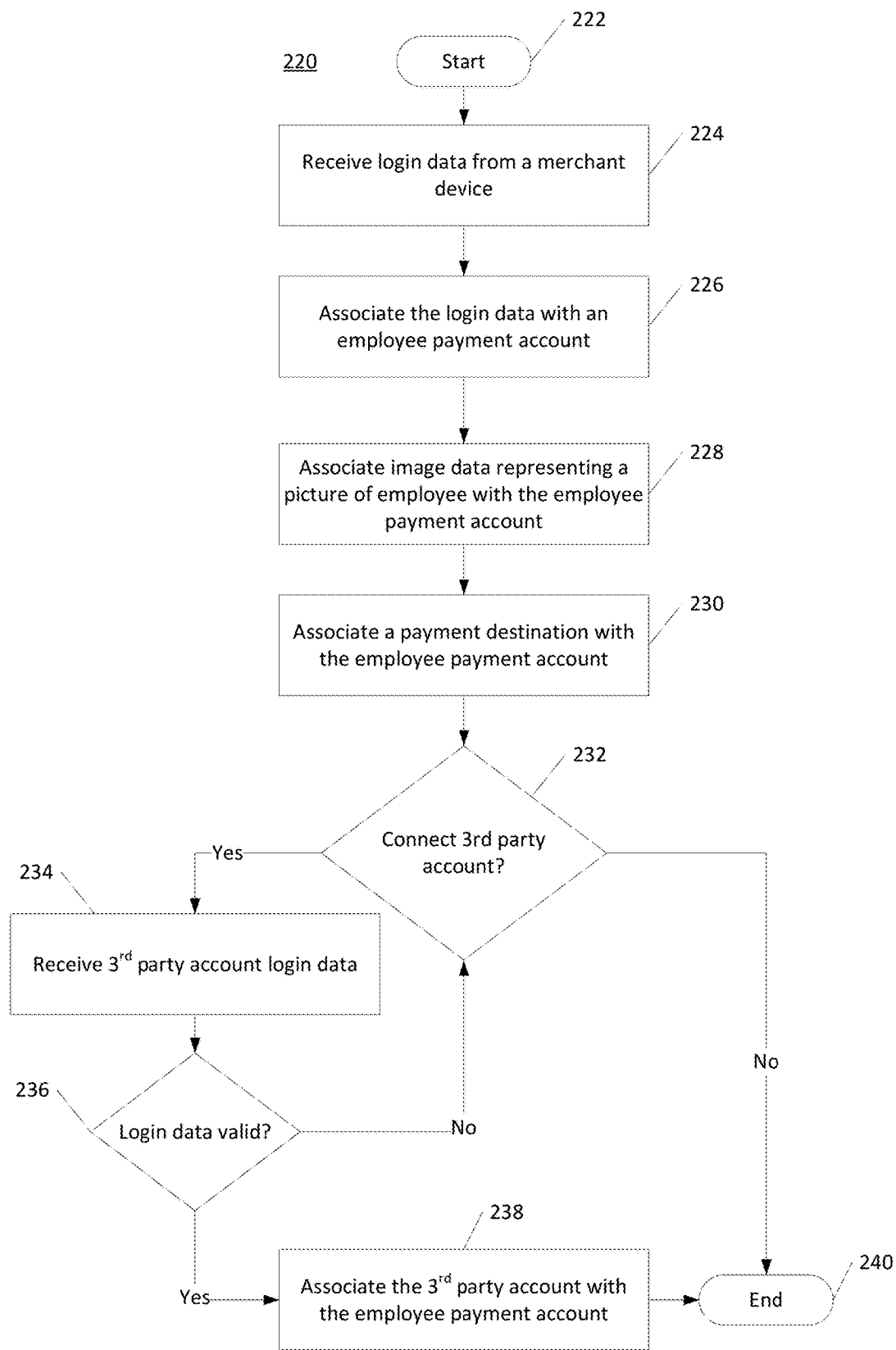
Figure 13:
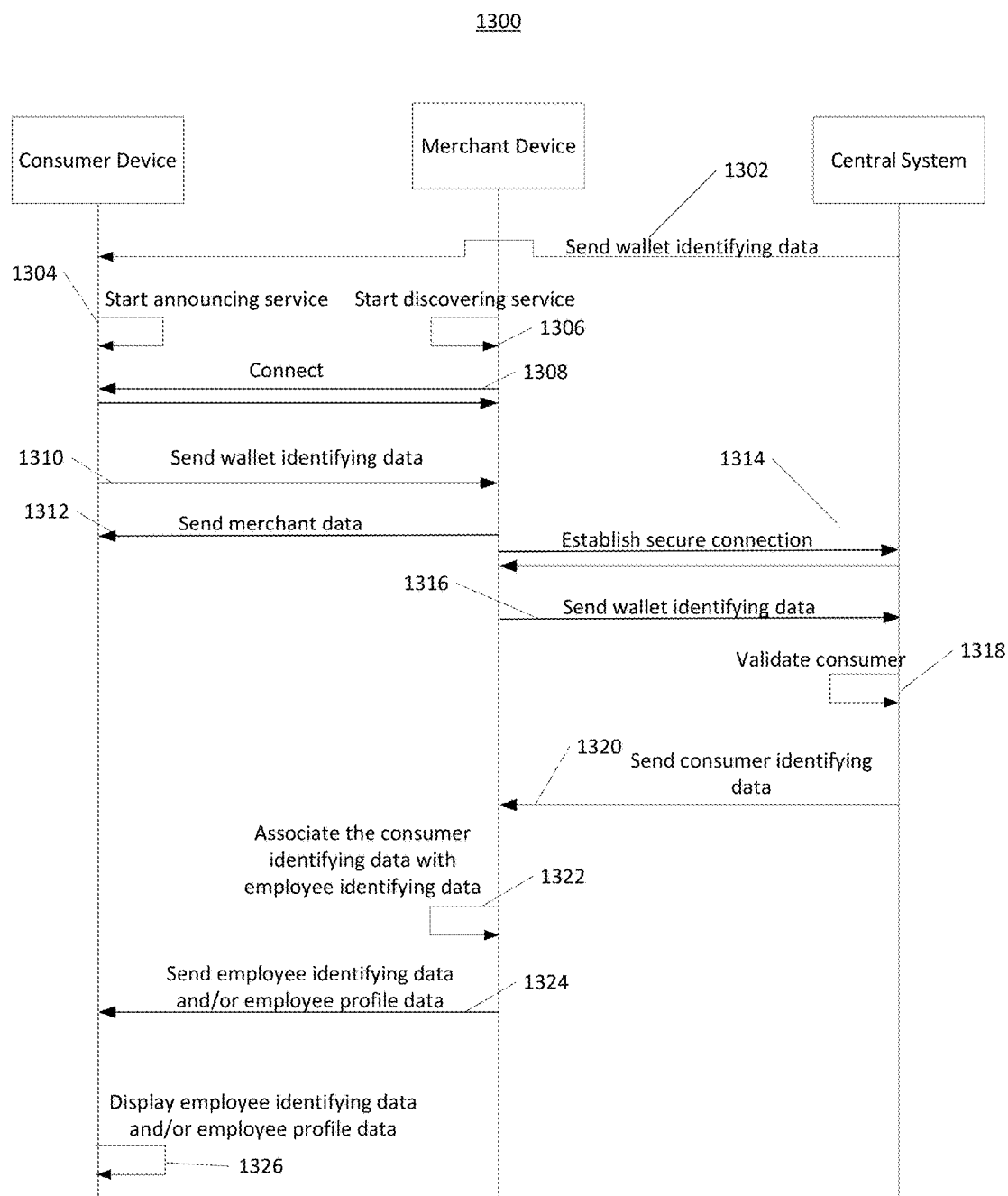
Figure 14:
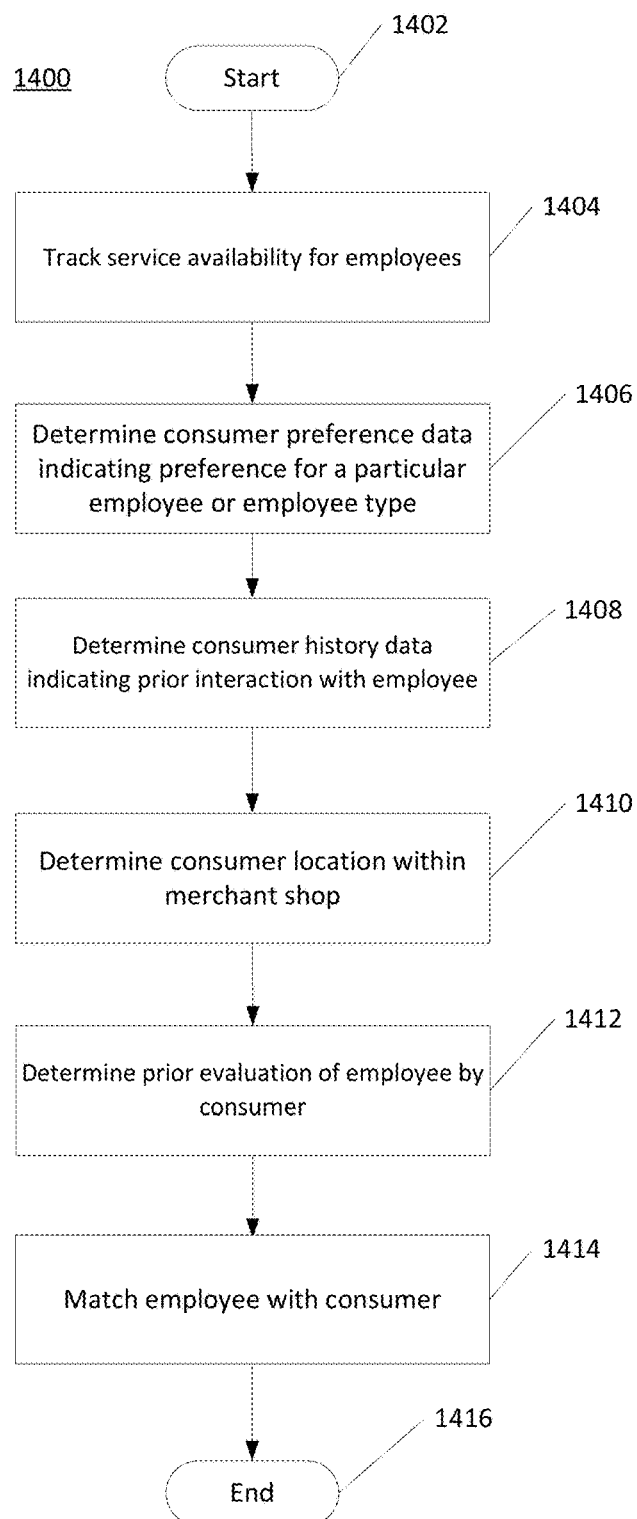
Figure 15:
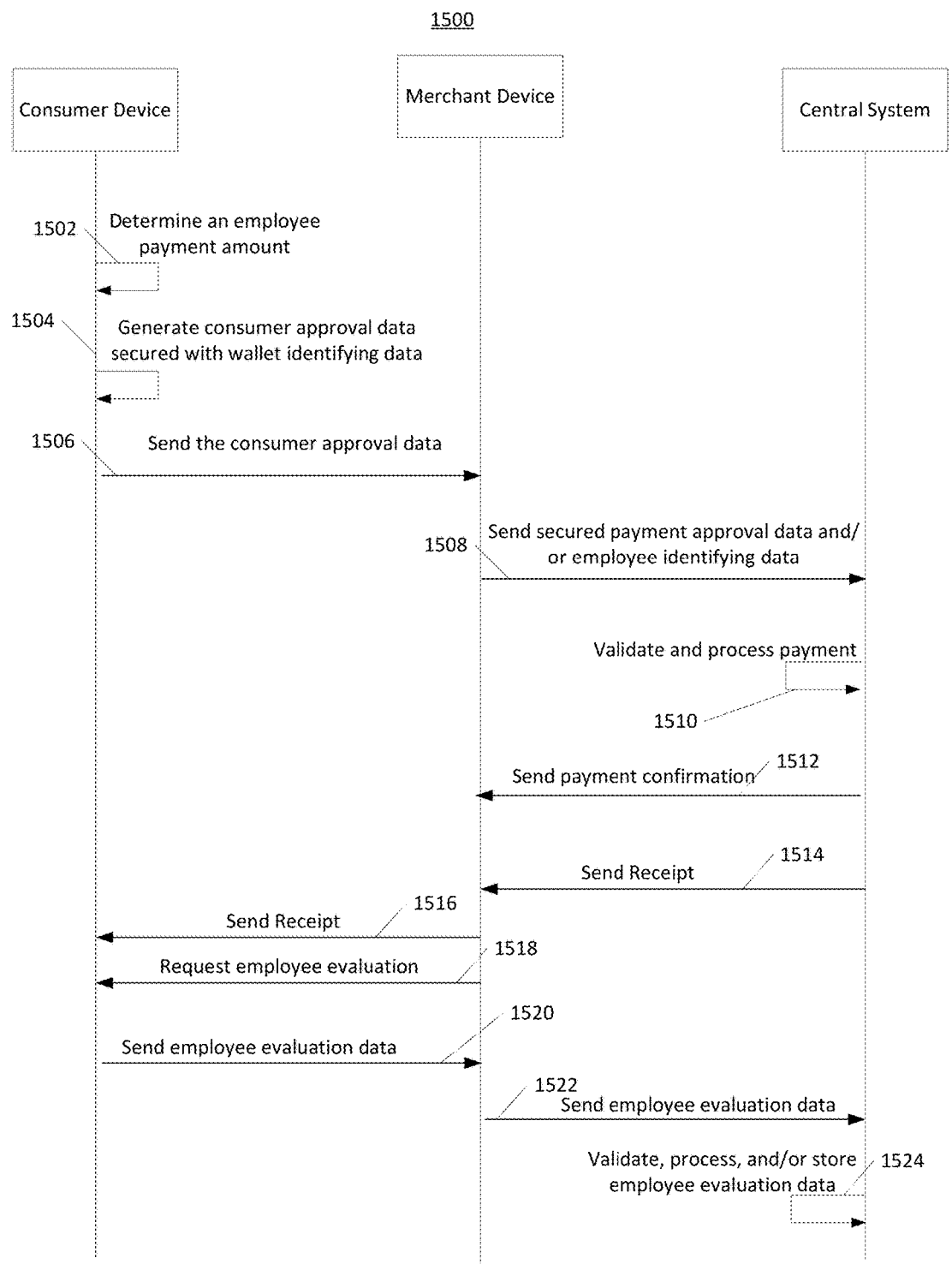
Figure 26:
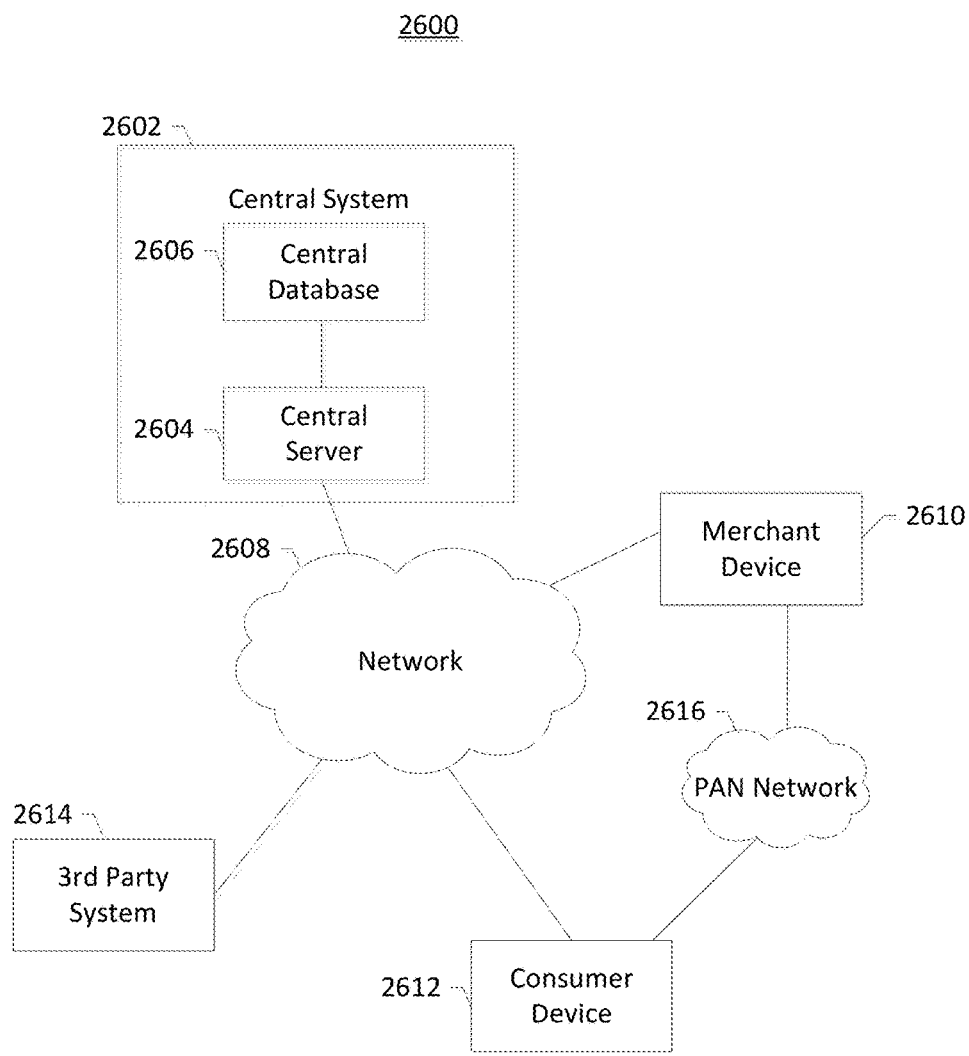
Figure 27:
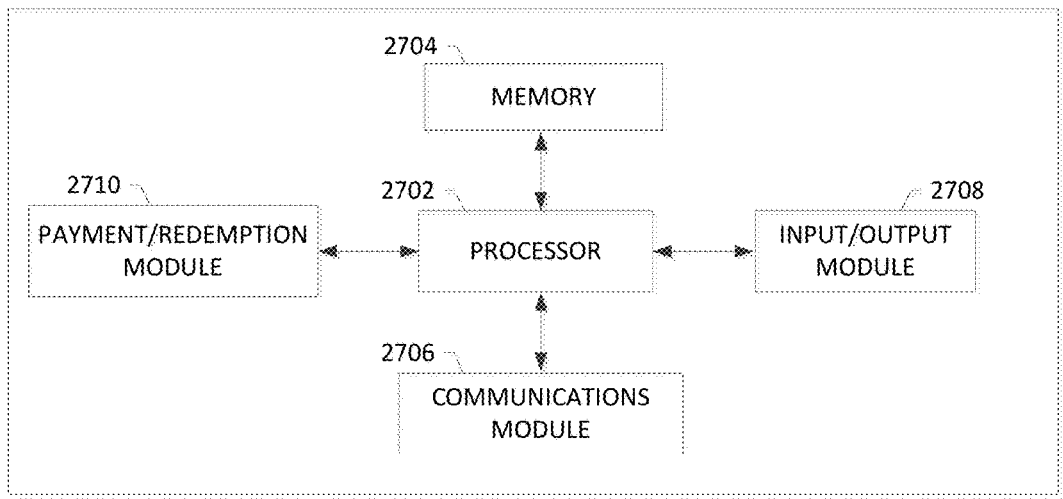

Having thus described some embodiments in general terms, reference will now be made to the accompanying drawings, which are not necessarily drawn to scale, and wherein:

FIG. 1a shows a flow chart of an example method for associating a consumer and an employee, performed in accordance with some embodiments;

FIG. 1b shows a flow chart of an example method for facilitating a transaction between a consumer and an employee, performed in accordance with some embodiments;

FIG. 2a shows a flow chart of an example method for accessing an employee payment account, performed in accordance with some embodiments;

FIG. 2b shows a flow chart of an example method for creating an employee payment account, performed in accordance with some embodiments;

FIGS. 3-12 show example graphical user interface displays that may be presented by various components of systems, in accordance with some embodiments;

FIG. 13 shows a flow chart of an example data flow for associating an employee with a consumer, performed in accordance with some embodiments;

FIG. 14 shows a flow chart of an example method for matching an employee with a consumer, performed in accordance with some embodiments;

FIG. 15 shows a flow chart of an example data flow for facilitating transactions between a consumer and an employee, performed in accordance with some embodiments;

FIGS. 16-25 show example graphical user interface displays that may be presented by various components of systems, in accordance with some embodiments;

FIG. 26 shows an example system for facilitating interactions between employees and consumers, configured in accordance with some embodiments; and FIG. 27 shows an example schematic block diagram of circuitry, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Embodiments discussed herein may be configured to provide payments via a mobile device (e.g., a consumer device). In this regard, some embodiments may free a consumer from having to carry any traditional payment instructions, such as credit cards, currency, checks, and/or other items typically stored in a physical wallet. Instead, the consumer may associate a consumer payment account with the consumer device, such as a mobile phone, and make payments from the consumer payment account simply by carrying and/or using the consumer device. For example, rather than hand a credit card and/or other tangible form of payment to a merchant, the consumer device may be configured to provide (e.g., automatically and/or in response to receiving a user indication to do so) wallet identifying data that secures payment via a networked central system.

Some embodiments discussed herein allows for the creation of employee profiles. For example, an employee may create a profile that identifies the employee and further includes personal information that can be made available to consumers. Via a variety of techniques discussed herein, one or more employees may be seamlessly associated with a particular consumer in the course of ordinary business. As such, the consumer may be assisted by a familiar employee when the consumer visits the merchant, thereby facilitating the creation of personal relationships that enhance customer satisfaction and loyalty.

In some embodiments, an employee payment account (e.g., an account that belongs to the employee and configured to receive and/or make payments) with the employee. As such, consumers may make payments via consumer device directly to the employee payment account (e.g., to provide a tip or other payment, regardless of whether the consumer makes a concurrent payment to the merchant).

Some embodiments may further provide for the matching of employees and consumers. For example, employee matching may be based on factors such as past interactions, employee evaluations, consumer preferences, employee skillsets and/or employee availability. As such, employees may develop a "clientele" of associated consumers, thereby facilitating a stronger personal connections and greater incentive and/or capability to provide quality service. Furthermore, employees may performance with respect to consumer interaction may be tracked and analyzed.

An advantage that may be realized by some embodiments discussed herein allows for secure payments between the consumer device and a merchant device (whether the payment is to an employee or a merchant). As such, consumers, employees and merchants may be protected from unauthorized devices and/or fraudulent payments.

Another advantage that may be realized by some embodiments discussed herein is that the consumer device and/or merchant device can be configured to facilitate a network-based payment without an active connection with the central system (e.g., via the Internet) at the time of the transaction between the employee and consumer occurs, such as by using the PAN connection or other unsecure direct connection. Despite the lack of an active connection to the central system, the consumer device and/or merchant device may make secure payments by sharing the wallet identifying data via the connection. In some embodiments, the wallet identifying data and/or consumer approval data may be stored at the merchant device and later sent to the central system for additional processing (e.g., to complete a financial transaction) when an active connection is established.

Other advantages that may be realized by some embodiments discussed herein include allowing a merchant to ensure that the consumer device user is in fact the real person authenticated to the consumer device, allowing payments between two peer devices, providing promotional offerings (e.g., promotional vouchers, sales, discounts, rewards, or the like) to the consumer, and/or facilitating consumer service and point-of-sale functionality.

Associating Consumers and Employees Overview

FIG. 1a shows a flow chart of an example method 100 for determining the presence of a consumer, performed in accordance with some embodiments. Method 100 is meant to show a high level example, while some of the other processes flows and other drawings discussed herein show more detailed examples. While other embodiments may operate differently, the examples discussed herein are largely focused on detecting the consumer's presence (e.g., location within an identified environment such as, for example, a retail store) based on a consumer device being in communicable range with a merchant device. In one embodiment, the consumer device and the merchant device are each configured to wirelessly communicate or interface with one another. For example, the consumer device and the merchant device may be running a Bluetooth-compliant protocol, such as Bluetooth v4, and/or be may be configured to establish/join any other type of public access network (PAN).

At 102, a central system may be configured to send wallet identifying data to a consumer device. The term "central system" as used herein refers to any marketing system, payment processing system, coupon provider system, and/or any other type of promotional system controlled by a merchant, third party and/or any other type of user (e.g., such as hardware provider, software application developer, online retailer, brick-and-mortar retailer, etc.). The central system may be accessible via one or more computing devices and may be operable to provide example promotion and/or marketing services on behalf of one or more providers that are offering one or more vouchers that are redeemable for goods, services, experiences and/or the like. The central system may be further configured to illustrate or otherwise inform one or more consumers of the availability of one or more vouchers (e.g., deals) in the form of one or more offers. In some examples, the central system may also take the form of a redemption authority or payment processor, it may provide rewards indications and/or it may function as an entity within a financial network. As such, the central system is, in some example embodiments, configured to present one or more offers, accept payments for offers from both merchants and consumers, upon acceptance of an offer, issue vouchers, indicate whether a voucher is valid for the purpose of redemption, generate rewards, provide a point of sale device or otherwise participate in the exchange of goods, services or experiences for currency and/or the like. In some embodiments discussed herein, the central system is referred to as a networked device.

In some embodiments, the wallet identifying data may each include a wallet identifying token and an associated private key. The wallet identifying token may be used to identify the consumer while the private key may be used to secure payments. As such, wallet identifying data may be used to encode and/or otherwise secure messages, or simply function as random data that has no meaning without having secure access to the central system and more particularly to the private key. Private information such as consumer identifying data, merchant data, financial data, transaction data, and/or other sensitive, non-random data may be secured and/or otherwise represented by the wallet identifying data, such that the wallet identifying data can be broadcast publically (e.g., over an unsecured PAN) while mitigating the risk that non-authorized users and/or devices might obtain sensitive financial information about the consumer, merchant, transaction, etc. For example, the wallet identifying data may be random data associated with the more sensitive, less random data, and the wallet identifying data can be transmitted over at least some types of communication links (e.g., unsecured or less secured wireless networks or direct connections) instead of the more sensitive, less random data. Additional details regarding wallet identifying data management applicable to some embodiments are discussed in U.S. patent application Ser. No. 13/764,753, entitled "Consumer Device Payment Token Management," incorporated by reference above.

In some embodiments, the consumer device may be configured to broadcast the wallet identifying data (e.g., the wallet identifying token) it receives from the central system at 102 at some and/or all times. For example, whenever the consumer device is running a corresponding software application or otherwise set to broadcast (e.g., as the application runs in the background of the consumer device's operating system), the consumer device can be configured to broadcast and/or otherwise send the wallet identifying data at 104. As discussed above, the link between consumer device and the merchant device used to send the wallet identifying data can be an unsecure connection (such as a Bluetooth connection, public WiFi connection, near field communication connection, etc.) without unduly raising consumer privacy risks. Nonetheless, some embodiments may utilize a secure connection between the consumer device and the merchant device (e.g., Wired Equivalent Privacy (WEP), Wi-Fi Protected Access (WIPA), Wi-Fi protected Access version 2 (WPA2), etc.).

In some embodiments, the merchant device will only receive the wallet identifying data from the consumer device at 104 when the consumer device is in communicable proximity (e.g., within Bluetooth broadcast range) with the merchant device. Hence, when the merchant device receives the wallet identifying data from the consumer device, the merchant device and/or the central system can be configured to determine that the consumer device is physically located proximate the merchant device. For example, in one embodiment, the consumer may walk into a merchant shop while carrying the consumer device with an application running that causes the consumer device to broadcast the wallet identifying data. The consumer device may be configured to connect or pair with one or more merchant devices at 104, such as via a PAN (e.g., using Bluetooth) when the consumer device comes within a communicable range to the merchant device.

In some embodiments, the consumer device and the merchant device may communicate via the newly established connection or PAN and/or perform payment transactions without requiring that the consumer device have an active connection to the central system or some other payment processing system (e.g., via the Internet). The connection between the consumer device and the central system at 102 is not required to be active or otherwise available at 104. For example, mobile broadband connections between the consumer device and the Internet may become unavailable as the consumer device enters certain indoor merchant facilities and/or remote geographic locations.

When the merchant device establishes its own connection to the central system, which in some embodiments may be permanent or episodic, the merchant device may be configured to send the wallet identifying data to the central system at 106. In some embodiments, the merchant device and the central system may share a relatively secure connection when compared to that between the consumer device and the merchant device. In still other embodiments, a dedicated secure connection between the merchant device and the central system may be maintained.

At 108, the central system may be configured to send consumer identifying data (e.g., image data, consumer name, consumer account information) and/or any other type of consumer information (e.g., consumer preference data, consumer history data (e.g., indicating prior interaction with particular employees), purchase history, promotional deals, promotional vouchers of the merchant available for purchase by the consumer, promotional vouchers redeemable at the merchant, or any other preference related information) to the merchant device. As discussed below, this information can be based on data uploaded directly from the consumer's device(s) to the central system and/or collected based on the consumer's interactions (e.g., either via the consumer device or some other device), with the merchant device and/or other devices such as with a promotional system, third party system and/or separate payment processing system.

At 110, the merchant device may be configured to associate employee identifying data that identifies an employee with the consumer identifying data. As such, the consumer is associated with a particular employee of the merchant. As discussed in greater detail below, the determination of the particular employee from a plurality of employees for association with the consumer identifying data may be based on any number of different criteria and may be performed by the merchant device and/or the central system.

For example, some embodiments of the central system may be configured to determine one or more employees from a group of potential employees to be associated with the consumer identifying data at 110. The central system may perform a determination of a particular employee based on the consumer-related information and may send the determined employee's employee identifying data to the merchant device.

Employee Payment Overview

FIG. 1b shows a flow chart of an example method 120 for facilitating a financial transaction between a consumer and an employee of a merchant, in accordance with some embodiments. Method 120 is meant to show a high level example, while some of the other processes flows discussed herein show more detailed examples. In some embodiments, method 120 may be performed after method 100.

At 122, the consumer device may be configured to determine an employee payment amount. For example, the employee identifying data discussed above at 110 may be further associated and/or configured to be usable for identifying the employee payment account. The employee payment account may be used to receive payments. Similarly, as discussed above, the wallet identifying data discussed above in connection with method 100 may be further associated and/or configured to be usable for identifying a consumer payment account. The consumer payment account may be configured to make payments, such as to the employee payment account and/or any other type of suitable account. While method 120 is described herein as being directed to payments from consumer to employee, the consumer payment account and/or employee payment account may be further configured to make and/or receive payments in some embodiments.

In some embodiments, the merchant device may be configured to send transaction data to the consumer device. The transaction data may include a merchant payment amount which may be used by the consumer device to determine the employee payment amount (e.g., a tip amount based on a sale amount). In some embodiments, the transaction data may include a transaction ID (a unique number or code generated by the point-of-sale device for each transaction), a merchant ID (a unique number or code associated with each merchant), and/or the like. In another example embodiment, the transaction data may include the merchant ID and the payment amount. The merchant payment amount may be determined from item data indicating one or more items selected for purchase by the consumer. The item data may further include price data for the one or more items. In some embodiments, the item data may be generated by the merchant device (e.g., via merchant input) and/or from one or more input devices coupled thereto (e.g., a barcode scanner, magnetic stripe reader, user keypad, touchscreen display, RFID reader, etc.). As such, the merchant device may be configured to receive the item data, determine the transaction data based on the item data, and send the transaction data to the consumer device. Additionally and/or alternatively, the consumer device may be configured to perform one or more of the functions related to generating the transaction data (e.g., item selection and/or input via consumer device). In still other embodiments, the merchant device may send the item data (e.g., a UPC code) to a server or host to retrieve from the server or host the transaction data (including a payment amount and other product or service data). Alternatively or additionally, the transaction data may include a field or other property that is indicative that a tip or other modification of the payment amount is authorized in a transaction. In some embodiments, the transaction data may further include the item data (e.g., to indicate to the consumer the items that accounted for the payment amount.)

At 124, the consumer device may be configured to send consumer approval data indicating approval of a payment of the employee payment amount to an employee payment account. As discussed below in greater detail, in some embodiments, the consumer device may be further configured to use wallet identifying data to secure the consumer approval data. In some embodiments, the wallet identifying data used at 124 may be the same as the wallet identifying data send to the merchant device at 104 of method 100. Alternatively, the wallet identifying data used at 124 may be different from the first wallet identifying data sent to the merchant device at 104 of method 100. In some embodiments, the wallet identifying data used at 124 may be a wallet identifying token while the wallet identifying data used at 124 may be the corresponding private key. The communication between the consumer device and the merchant device, as well as any and/or all direct communications between the consumer device and the merchant device, may use the PAN connection established at 104 of method 100.

In one embodiment, the consumer approval data may consist of an electronic signature created by appending the private key to a data string representing the transaction data and then performing an algorithmic transformation, such as a one way hash of the private key appended data string. In some embodiments, the private key used at 124 may be the same wallet identifying data as the wallet identifying token sent to the merchant device at 104 of method 100. The communication between the consumer device and the merchant device, as well as any and/or all direct communications between the consumer device and the merchant device, may use the PAN connection established at 104 of method 100. Alternatively or additionally, the consumer device may be configured to encrypt the transaction data and the consumer approval data using the private key.

At 126, the merchant device may be configured to generate secured payment approval data based on the consumer approval data and the transaction data. The merchant device may then be configured to send the secured payment approval data to the central system. The central system may use this information to determine whether to execute a payment by the consumer to the merchant. In some embodiments, the central system may be configured to validate or otherwise authenticate the secured payment approval data received from the merchant device. For example, the central system may be configured to validate and/or otherwise authenticate the secured payment approval data based on the wallet identifying token or associated private key (e.g., as sent to the consumer device at 102 of method 100 and later received from the merchant device). Alternatively or additionally, the central service may be configured to decrypt the transaction data and the consumer approval data using the private key in example embodiments in which the consumer device and/or the merchant device caused the consumer approval data, the secured payment approval data or the like to become encrypted. In some embodiment, the secured payment approval data may include the consumer approval data received from the merchant device.

In some embodiments, a transaction receipt (e.g., information about the particular transaction) and/or other receipt information may be sent to the consumer device from the central system at 130A. The other receipt information can include, for example, a remaining balance and/or purchase power after the instant transaction (e.g., the amount of money until the consumer payment account reaches the applicable credit limit(s), the amount of money remaining in the consumer payment account after the transaction is processed, etc.), total spent over a given period of time (e.g., the amount of money spent in an hour, day, week, etc. including the instant transaction), total spent at a given merchant and/or location (e.g., amount of money spent at the merchant over a period of time, amount of money spent in a city over a period of time, etc.), and/or any other purchase-related information that may be of interest to the consumer subsequent to a transaction (including information that may help identify fraud and/or improper use of the consumer payment account).

If the central system validates the secured payment approval data, then a payment confirmation may be sent to the merchant device at 128. In some embodiments, a transaction receipt (e.g., information about the particular transaction) and/or other receipt information may be sent to the consumer device from the central system at 130A. The other receipt information can include, for example, a remaining balance and/or purchase power after the instant transaction (e.g., the amount of money until the consumer payment account reaches the applicable credit limit(s), the amount of money remaining in the consumer payment account after the transaction is processed, etc.), total spent over a given period of time (e.g., the amount of money spent in an hour, day, week, etc. including the instant transaction), total spent at a given merchant and/or location (e.g., amount of money spent at the merchant over a period of time, amount of money spent in a city over a period of time, etc.), and/or any other purchase-related information that may be of interest to the consumer subsequent to a transaction (including information that may help identify fraud and/or improper use of the consumer payment account).

In addition to or instead of the receipt being sent from the central system to the consumer device at 130A, a transaction receipt and/or other receipt information may be sent to the consumer device from the merchant device at 130B. The receipt information sent from the merchant device can be the same as or different than that sent at 130A, and/or can be independent of or based on receipt information generated by the central system. For example, the merchant device can be configured to send an independent receipt to the consumer device that the consumer can use to verify the receipt information sent from the central system at 130A. This may aid the consumer in confirming that the central system actually charged the payment amount (and/or help the consumer identify a discrepancy between the expected charge and the amount actually charged). As another example, the central system may also or instead send receipt information to the merchant device, which may then send the receipt to the consumer device.

Employee Payment Accounts and Profiles

FIG. 2a shows a flow chart of an example method 200 for accessing an employee payment account, performed in accordance with some embodiments. Method 200 will be described with reference to example displays 300-1200 shown in FIGS. 3-12, respectively.

FIGS. 3-12 show example displays 300-1200 that may be presented by one or more display screens of one or more machines, such as those used by merchants or their employees, which are referred to herein as "merchant devices." As such, a merchant device may refer to a device that belongs to the merchant used by the employee or a device that personally belongs to the employee. In some embodiments, techniques similar to those described herein with respect to method 200 and FIGS. 3-12 may further be used for accessing a consumer payment account by a consumer, such as via a machine used by a consumer referred to herein as a "consumer device." While the example displays 300-1200 are configured to be shown on a smartphone (or other device having similar dimensions), similar interfaces may be utilized with other types of merchant devices discussed herein and modified accordingly (e.g., for screen size, input device compatibly, ease of use, etc.).

A merchant device or consumer device may refer to a mobile device or a stationary device. Example mobile devices may include a cellular telephone (including smartphones and/or other types of mobile telephones), laptop, wireless POS device, tablet, wireless computing device, or the like. Example stationary devices may include a desktop computer, work station, wired POS device, server, or the like.

In some embodiments, any physical device may be configured to perform the functionalities described herein with respect to both merchant devices and consumer devices. For example, a device may be configured to make a payment (e.g., like a consumer device) and also receive a payment (e.g., like a merchant device), among other things described herein.

In some embodiments, the techniques described herein may be implemented via one or more applications that execute locally and causes a merchant/consumer device to be configured to function as a specialized machine. Additionally or alternatively, cloud-based, multi-tenant, thin-client, and/or other types of networked service techniques may be used. For example, one or more functionalities described herein as being performed by a merchant device or consumer device may execute on a remote device, such as a server and/or other networked machine. User input information may be generated by and sent from the merchant/consumer device to the remote device, while visual and/or audio information is sent from the remote device to the merchant/consumer device.

Figure 3:
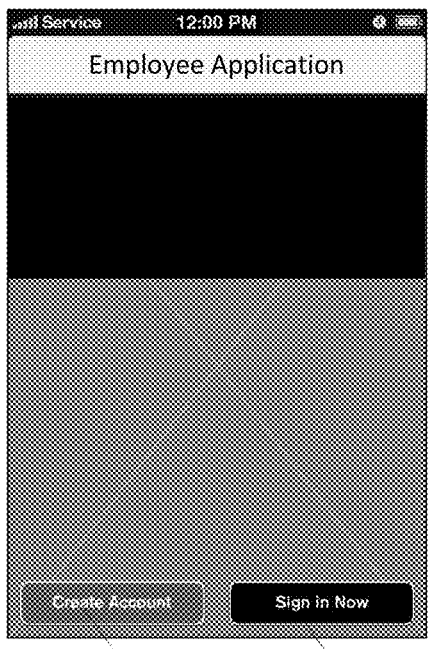

Turning back to FIG. 2a, method 200 shown therein may start at 202 and proceed to 204, where a merchant device (e.g., merchant device 2610 shown in FIG. 26) may be configured to provide a login display. For example, FIG. 3 shows login display 300 that may be displayed by the merchant device. Login display 300, like some or all of the other displays discussed herein, may be accessed by virtually any method, such as an application executing locally. Alternatively and/or additionally, login display 300 may be accessed from one or more servers (e.g., central server 2604 shown in FIG. 26) via a web browser, such as by entering an address (e.g., a uniform resource locator ("URL") address) into the web browser's location bar. Login display 300 may be configured to allow an employee to create an employee payment account and/or sign in to an existing employee payment account. As such, login display 300 may include create account selection 302 and sign in selection 304.

Login display 300 may be provided to a merchant device for an employee that is logging in for work (e.g., to login to an existing employee payment account) for purposes such as receiving payments, scheduling, time-keeping, assisting consumers, task assignments, management, or the like. In some embodiments, one or more merchant devices may be used by multiple employees to login. For example, the merchant may leverage one or more group merchant devices which are not necessarily associated with a single employee. In some embodiments, a merchant may utilize multiple merchant devices that may be associated with a particular employee. For example, employees of a retailer or restaurant may each carry a merchant device in the course of assisting consumers.

Figure 4:
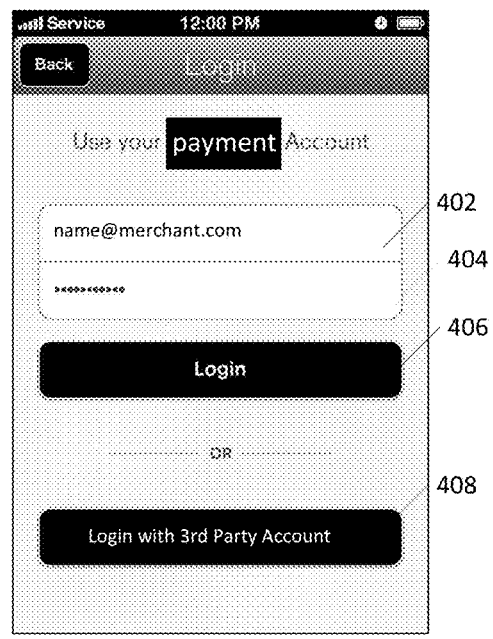

At 206, the central system may be configured to determine whether the employee has provided login data for the employee payment account. For example, the employee may select sign-in selection 304 in login display 300 to indicate a desire to sign-in to a preexisting employee payment account. In response, the merchant device may be configured to accept login data (e.g., a username, password, biometric identifier, etc.) for the employee payment account. For example, login input display 400, as shown in FIG. 4, may be configured to accept the login data. The employee may enter a username to username field 402, a password to password field 404, and submit information (e.g., to the central system) by selecting login selection 406. Alternatively and/or additionally, a pin number or some other form of identification or authentication may be used. In some embodiments, login input display 400 may include a list of employees from which the employee may select (e.g., with or without additional authentication). As such, login data as used herein is not limited to embodiments that include a username and password.

If the employee provides login data at 206, method 200 may proceed to 208. At 208, the central system may be configured to determine whether the login data is valid. For example, the login data received from the merchant device may be compared with login data stored in one or more databases (e.g., central database 2602 shown in FIG. 26).

In some embodiments, the central system may be configured to determine whether the employee has provided third party login data for a third party account. For example, the employee may select third party login selection 408 in login input display 400, which may allow the employee to enter the third party login data (e.g., a username and password for the third party account).

The third party account may be any type of account that is provided by one or more third party servers (e.g., third party system 2612 shown in FIG. 26). As will be discussed in greater detail with respect to FIG. 2b, the employee may associate one or more third party accounts with the employee payment account, allowing the employee to access the employee payment account via the third party account (e.g., by logging in and/or otherwise authenticating with third party login data). Example third party accounts may include an email account, a social networking account, an account provided by a merchant, a banking account, etc.

If the employee provides the third party login data, a determination may be made as to whether the third party login data is valid at 208. For example, the central system may be configured to send the third party login data to an appropriate third party server/system (e.g., with a login request). The central system may be further configured to receive an indication regarding whether the login data is valid or invalid in response. As such, some embodiments may allow the employee to access the employee payment account via one or more different third party accounts and via providing third party login data.

If the login data is determined to be valid at 208, method 200 may proceed to 210, where the central system may be configured to provide access to the employee payment account. As will be discussed in greater detail, the merchant device may be configured to, among other things, receive payments via the employee payment account, associate one or more payment destinations and/or sources with the employee payment account, and/or view confirmations (e.g., receipts or summaries) of payments after receiving access to the employee payment account.

If the login data is determined to be invalid at 208, method 200 may return to 206 where a determination may be made as to whether the employee wants to make another attempt at providing login data for the employee payment account. In some embodiments, the employee payment account (e.g., as identified by username field 202) may be locked out after a certain number of unsuccessful login attempts.

Returning to 206, if the employee does not provide login data, method 200 may proceed to 212. At 212, the central system may be configured to allow the employee to create a new employee payment account. As discussed above, the employee may select create account selection 302 at login display 300. Responsive to the selection, the central system may be configured to provide interfaces (e.g., displays 500-1200 shown in FIGS. 5-12) to the merchant device for creating the employee payment account, which will be described in further detail with respect to example method 220 shown in FIG. 2b. After creating the employee payment account, the merchant device may be allowed to access the employee payment account using method 200. Method 200 may end at 214.

Figure 5:
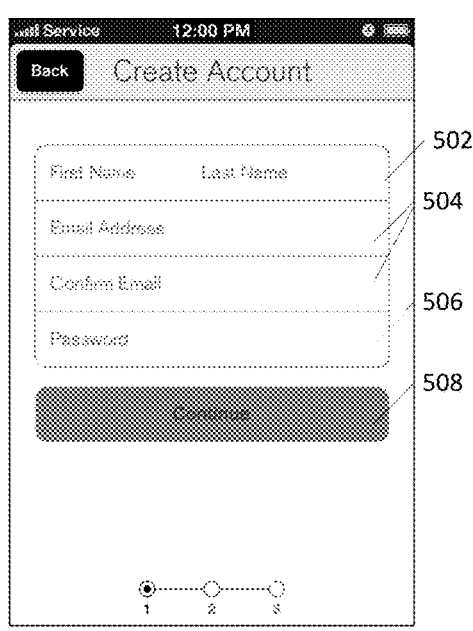
Figure 6:
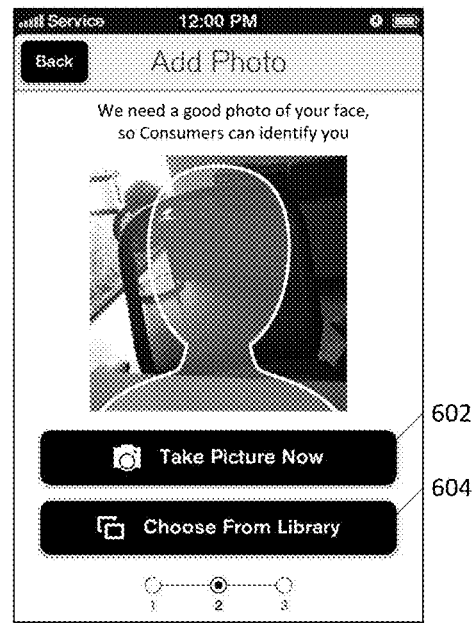

FIG. 2b shows a flow chart of an example of a method 220 for creating an employee payment account, performed in accordance with some embodiments. Method 220 may begin at 222 and proceed to 224, where the central system may be configured to receive login data for the employee payment account from the merchant device. FIG. 5 shows an example create account display 500 that may be presented by the merchant device, such as on a display screen. Create account display 500 may include name field 502, email address fields 504, and password field 506. In some embodiments, an email address entered into email address fields 504 may be used as the username for the employee payment account (e.g., at username field 402, as shown in FIG. 4). Alternatively and/or additionally, the employee may enter a username that is different from the email address. The merchant device may be configured to send the login data to the central system responsive to the employee selecting continue selection 508.

In some embodiments, a different merchant device may be used to create the employee payment account in method 220 than to access the employee payment account in method 200. For example, the merchant device used to create the employee payment account may be a personal device of the employee while the merchant device used to access the employee payment account may belong to the merchant, or vice versa. In another example, different merchant devices of the merchant may be used. For example, the merchant may own multiple merchant devices that may be used by its employees to create and/or access different employee payment accounts. In a third example, one or more central or administrative stationary merchant devices may be used to create employee payments accounts while one or more other mobile merchant devices may be used by employees to access their employee payment accounts in the course of assisting consumers or other business.

At 226, the central system may be configured to associate the login data received from the merchant device with an employee payment account. For example, associations between the login data may be stored in the one or more databases (e.g., central database 2606 shown in FIG. 26). As such, the employee may provide the login data to receive access to the employee payment account and/or associated data from any merchant device having access to the central system.

At 228, image data representing a picture of the employee may be associated with the employee payment account. For example, the merchant device may be configured to display add photo display 600 responsive to the employee selecting continue selection 508 in create account display 500. In some embodiments, the merchant device may include and/or otherwise be configured to control an image capturing device. The image capturing device may be any device configured to be able to capture the image data, such as a camera, a webcam, video recorder, etc. As such, the merchant device may be configured to allow the employee to capture the image data by selecting take picture selection 602. Additionally and/or alternatively, the employee may be allowed to choose existing image data (e.g., an image taken at an earlier time and stored) for association with the employee payment account, such as by selecting upload image selection 604.

Figure 7:
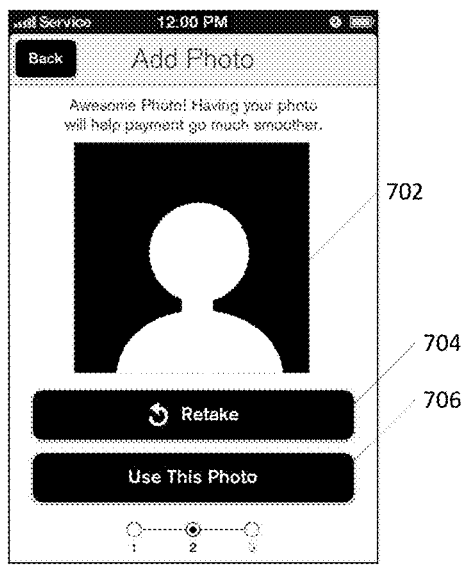

FIG. 7 shows an example confirm photo display 700 that may allow the employee to review captured and/or existing image data, in accordance with some embodiments. For example, the image data may be shown at employee image display 702. If the image data is unsatisfactory, the employee may select retake selection 704, which may cause the merchant device to redisplay add photo display 600 in response. If the image data is satisfactory, the employee may select use photo selection 706. The merchant device may be configured to send the image data to the central system responsive to the selection.

Returning to FIG. 2b, at 230, the central system may be configured to associate one or more payment destinations with the employee payment account. A payment destination, as used herein, refers to an account that is configured to receive payments. However, in some embodiments, the payment destination may also be configured to make payments.

In some embodiments, the payment destination may be a financial account, such as a checking account, debit account, direct deposit account, third party payment account, savings account, bank account, internet payment account, or the like. In that sense, "payment destination," as used herein, may refer to any type of account capable of being associated with a currency balance (e.g., dollars, credits, etc.), receiving a payment that increases the balance, and/or providing a payment that decreases the balance.

Figure 8:
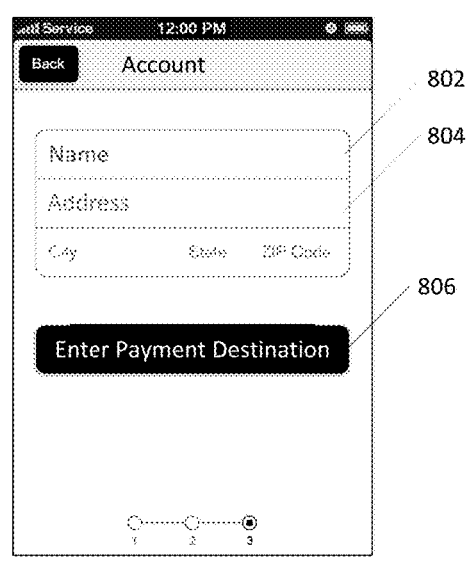
Figure 9:
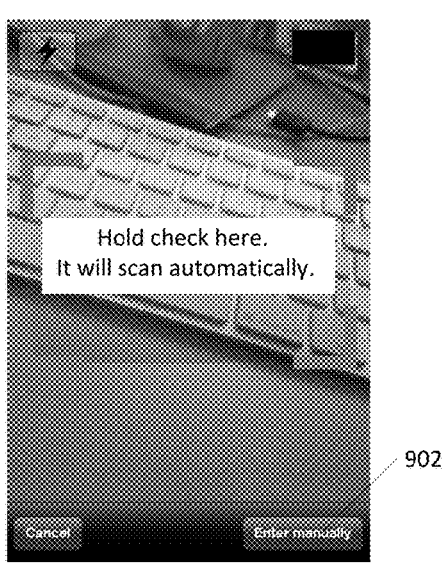

FIG. 8 shows an example add payment destination display 800 that may allow the merchant device to send account destination data to the central system, in accordance with some embodiments. The employee may enter a name and address at 802 and 804, respectively. The employee may further select enter payment destination selection 806, which may allow the consumer to enter a bank account as a payment destination. A bank account is only an illustrative example, and the techniques disclosed herein may be applicable to other types of payment destinations.

Upon selecting enter payment destination selection 806, the merchant device may be configured to allow the employee to scan a check. For example, the employee may hold a check to an image capturing device that may be configured to capture the check as image data, as shown in check capture display 900 in FIG. 9. The image data may be processed (e.g., using optical character recognition ("OCR")) to extract account destination data such as a routing number, bank name, an account number, among other things (e.g., name, address, etc.). As discussed above, other payment destinations may be used such as accounts associated with debit cards, online accounts, payment cards, or credit cards in some embodiments. Furthermore, other techniques for automatically reading account destination data from tangible forms of payment may be used instead of, or in addition to, OCR. For example, a barcode reader device that reads magnetic data when the employee swipes an instrument through the magnetic stripe reader device may be used.

Figure 10:
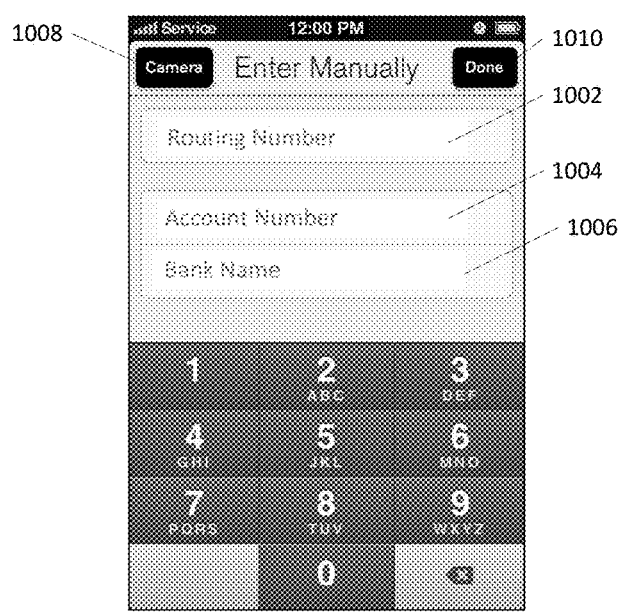

Additionally and/or alternatively, the employee may select enter manually selection 902, which may cause the merchant device to display manual entry display 1000, as shown in FIG. 10. The employee may enter account destination data such as a routing number at 1002, an account number at 1004 and a bank name at 1006. In some embodiments, extracted account destination data from the image data may be used to automatically populate these fields, allowing the employee to correct any mistakes (e.g., an OCR error). The employee may return to check capture display 900 via camera selection 1008. The employee may also submit the entered account destination data by selecting submit selection 1010.

Figure 11:
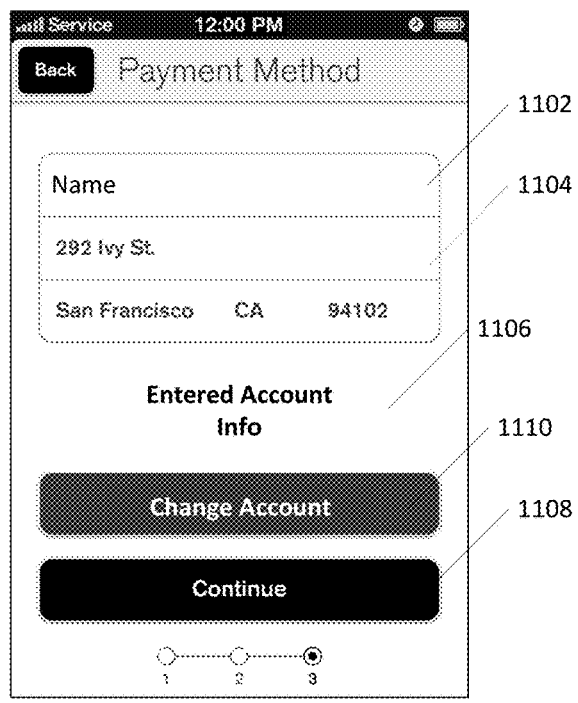
Figure 12:
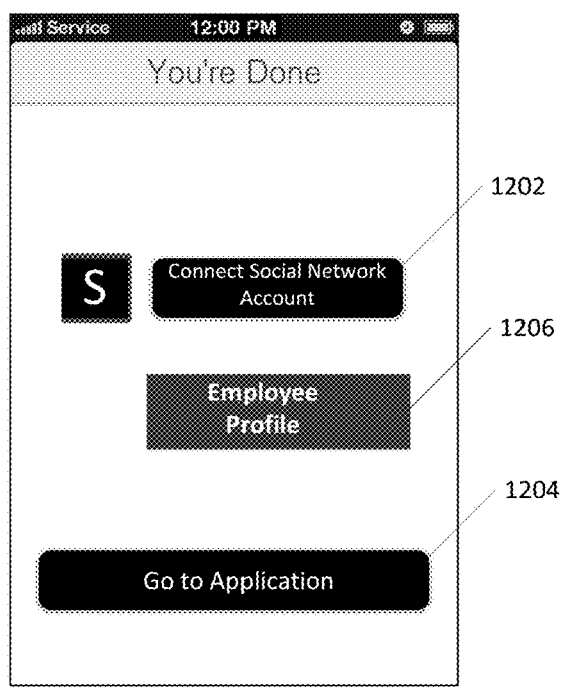

FIG. 11 shows an example confirm payment destination display 1100, in accordance with some embodiments. Confirm payment destination display 1100 may be shown, for example, after the central system has validated the account destination and/or account destination data. The employee may add a payment destination (and/or source) and/or replace the payment destination with a different payment destination, such as by selecting change account selection 1110. The employee may also indicate that the name at 1102, address at 1104, and/or entered account information at 1106 is correct by selecting continue selection 1108.

Returning to FIG. 2b, at 232, the central system may be configured to make a determination as to whether to associate one or more third party accounts to the employee payment account. In some embodiments, connecting a third party account may allow an employee to login to the employee payment account via the third party account, as discussed above at 206 of method 200. Additionally and/or alternatively, third party account data (e.g., user profile, social network data, etc.) may be used to generate, at least in part, an employee profile that may be presented to consumers. For example, the employee may use third party account connection display 300 to associate a third party account (e.g., a social network account) by selecting connect account selection 1202 in registration completion screen 1200.

At 234, the merchant device may be configured to prompt the employee for third party login data, which may be sent to the central system. The central system may be configured determine whether the third party login data is valid at 236, which may include communicating with a third party system/server. If the third party login data is valid, method 220 may proceed to 238, where the third party account may be associated with the employee payment account. If the third party login data is invalid, method 220 may return to 232, to determine whether the employee is still interested in connecting a third party account. If the employee is not interested in associating a third party account with the employee payment account, method 220 may end at 240. Returning to FIG. 12, the central system may be configured to provide access to the employee payment account, associated data, and/or functionality responsive to the employee selecting go to application selection 1204.

As discussed above, the employee may be associated with an employee profile. In some embodiments, some or all of the employee profile may be viewable by consumers, such as a consumer that is being assisted by the employee or seeking assistance. Therefore, the merchant device and/or central system may be configured to allow the employee to keep a separation between third party account information (e.g., personal social network information) and the employee profile. For example, only limited types of data, such as employee name, may be used in generating the employee profile. Furthermore, the employee may choose not to connect any third party account. In some embodiments, the employee may select employee profile selection 1206 in registration completion screen 1200 to create and/or edit the employee profile (e.g., regardless of whether there is a connected third party account).

Associating Consumers and Employees

FIG. 13 shows a flow chart of an example data flow represented by method 1300, which can result in associating an employee with a consumer, performed in accordance with some embodiments. Method 1300 may be performed by a consumer device (e.g., consumer device 2612 shown in FIG. 26), a merchant device (e.g., merchant device 2610) and a central system (e.g., central server 2606 and/or one or more networked machines). In some embodiments, method 1300 may be performed after an employee has logged in and/or otherwise authenticated with the central system, as discussed above in connection with method 200. Furthermore, as discussed above, similar techniques may be used to allow the consumer device to log in and/or authenticate with the central server to access a consumer payment account configured to make payments.

At 1302, the central system may be configured to send wallet identifying data to the consumer device. As such, the consumer device may be configured to store the wallet identifying data. "Wallet identifying data," as used herein, may refer to any type of data that may be used to secure data transfers between the consumer device and the merchant device and enable the consumer device to cause the merchant device to receive secure information about the consumer (and/or the consumer's payment account) from the central system. In some embodiments, each piece of wallet identifying data may include a wallet identifying token and a private key. The wallet identifying token and private key may include, or may be based at least partially on, a random or pseudorandom code, number, etc., generated by the central system. In various embodiments, the central system may be configured to associate the wallet identifying data with consumer identifying data that identifies a consumer, a consumer device and/or a consumer payment account. This association may be stored to a memory or database that is accessible by the central system.

In some embodiments, the wallet identifying token may be passed to other devices (e.g., a consumer device, a merchant device, a central system, etc.) to validate or authenticate various types of data. The private key may be used by the central system to correlate a wallet identifying token with consumer identifying data and to validate and/or otherwise verify secured payment approval data such that the data may be relied upon as authentic and, thus, processed or otherwise used. The private key may be kept secret by the central system and/or securely shared with only devices (e.g., consumer devices) authorized to use wallet identifying tokens and private keys as discussed in greater detail herein. In some embodiments, a wallet identifying token and a corresponding private key may be generated together and/or mathematically related such that determining the private key from the wallet identifying token (and vice versa) is very difficult, if not impossible, and extremely time consuming or prohibitively expensive.

In some embodiments, some or all of the messages sent by the consumer device to the merchant device (e.g., via an unsecured direct wireless connection) may be secured with the private key. Messages that are signed with the private key (e.g., the private key is appended or otherwise included with the message) may be used to identify the message sender and/or to authenticate the message sender (e.g., to prove that the sender is identified correctly). For example, if the central system receives a message from a merchant device in association with a proposed consumer device payment that was not secured with a valid (e.g., non-expired or otherwise expected) private key previously sent to the consumer device, the payment may be denied.

In various embodiments, a wallet identifying token may be used for a number of purposes including identifying a consumer, sending secure data, identifying a consumer payment account, signing messages by the consumer device that demonstrate consumer consent (e.g., for a payment), proving authenticity of messages, and/or encrypting messages.

Wallet identifying data may be sent to the consumer device at virtually any time. For example, the consumer device may be a smart phone that is configured to download an application from the central system (e.g., an online store of smart phone applications), and the downloading, installation and/or execution of the application can trigger the consumer device to receive the wallet identifying tokens. Additionally and/or alternatively, the wallet identifying tokens may be downloaded by the consumer device at a later time, such as at the consumer's request, at the creation of a consumer payment account, via a central system push, on a schedule basis (e.g., each day, each hour, each month, etc.), upon entering a certain proximity to a merchant device, upon establishing a connection with the central system, in the course of a transaction, upon the occurrence of a specified event or condition, combinations of the above, etc.

At 1304-1308, the consumer device and the merchant device may be configured to form a connection. In some embodiments, the connection may be formed without the consumer device and/or the merchant device having active Internet access at the time of the connection (e.g., an active connection to the central server). For example, the connection may be a wireless connection over a PAN (e.g., via PAN network 2416 shown in FIG. 24). Some suitable PAN protocols may include Bluetooth, Infrared Data Association (irDA), wireless USB, ZigBee, WiFi, and Z-Wave. In some embodiments, other types of connections between the consumer device and merchant device, such as direct wire, Internet, near field communications and/or radio frequency identification technologies, may be used. A "PAN connection," as used herein, may refer to any direct connection between the consumer device and the merchant device (e.g., via network 2616 rather than network 2608, as shown in FIG. 26). Similarly, a "PAN," as used herein, may refer to any suitable network for the direct connection.

Figure 16:
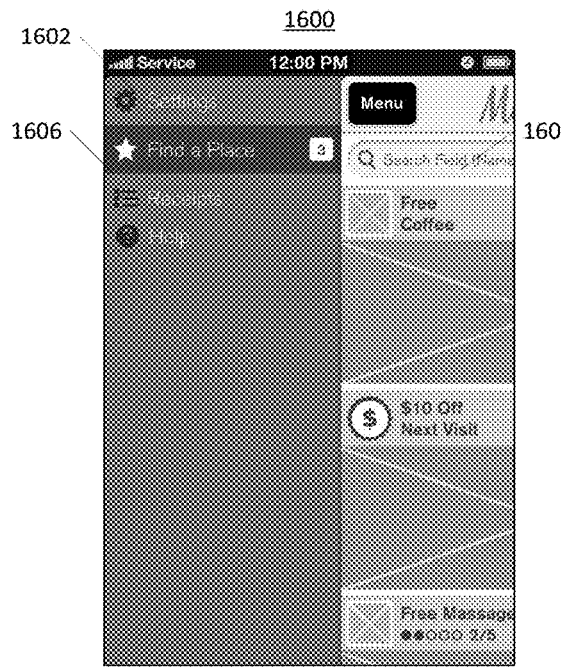

Depending on the protocol used, at 1304, the consumer device may begin announcing a consumer assistance service to other devices, such as the merchant device. For example, a process and/or application may configure the consumer device to broadcast (e.g., via Bluetooth) one or more suitable messages. FIG. 16 shows an example consumer assistance service menu display 1600 that may be displayed on the consumer device. The consumer may use settings selection 1602 to enable or disable the announcing of the consumer assistance service.

In some embodiments, the consumer assistance service may include one or more background processes that may run while the consumer device is locked, in a low-power mode, and/or executing other applications in the foreground. In some embodiments, the one or more broadcasted messages may include wallet identifying information and/or be encrypted using wallet identifying information.

At 1306, the merchant device may begin discovering the consumer assistance service. For example, a process and/or application may execute on the merchant device that configures the merchant device to discover other devices, such as the consumer device, that are currently announcing the consumer assistance service. In some embodiments, discovery of the consumer assistance service by the merchant device may be initiated after an employee has logged in, authenticated, or otherwise enabled such functionality on the merchant device.

In some embodiments, the consumer device may be configured to discover the consumer assistance service while the merchant device may be configured to announce the consumer assistance service. Additionally and/or alternatively, both devices may be configured to be capable of announcing and discovering the consumer assistance service. For example, both devices may discover compatible devices and/or be discovered by compatible devices.

At 1308, a connection between the merchant device and the consumer device may be created. For example, the consumer device and merchant device may come within a certain discovery range, such as when a consumer carrying the consumer device enters the merchant's shop. In some embodiments, the discovery range may be set by the merchant device and/or the consumer device and/or by the range at which the devices can be located from each other and still be able to communicate (e.g., Bluetooth capable devices may have a communicable range between 10 and 100 meters, depending on the type of device(s) being utilized).

In some embodiments, some or all of the messages used to form the connection between the consumer device and the merchant device at 1304-1308 may be encrypted and/or signed. For example, messages sent from the consumer device may be encrypted and/or signed with wallet identifying data. Additionally and/or alternatively, messages sent from the merchant device may be encrypted and/or signed with merchant identifying data and/or received wallet identifying data. In some embodiments, messages used to form the connection may not include any confidential information. Such messages, for example, may be left unsecured.

At 1310, the consumer device may be configured to send the wallet identifying data to the merchant device. For example, the wallet identifying data may be used as a secure reference for requests by the merchant device to the central system for additional consumer data. In some embodiments, the wallet identifying data may include a wallet identifying token but not the associated private key. In various embodiments, the consumer device may be further configured to send the consumer's name, URL for accessing the image data representing a picture of the consumer (e.g., as associated with the payment account at 210 of method 200), the image data itself, and/or other suitable consumer identification information with the wallet identifying data (e.g., as one or messages that are encrypted, signed, or simply unsecured). In some embodiments, the wallet identifying data sent to the merchant device at 1310 may be one of multiple wallet identifying data that the consumer device received from the payment server at 1302.

As discussed above, the wallet identifying data may provide a reference to consumer data (e.g., consumer identifying data and/or consumer-related data) available from the central system. As such, the wallet identifying data may be sent to the merchant device in place of actual consumer data that may be readily stolen by an unauthorized device via the PAN connection. Furthermore, the central system may be configured store the wallet identifying data in association with consumer identifying data, consumer payment account data, a consumer device identifier, and/or other consumer-related data prior to sending the wallet identifying data to the consumer device at 1302.

Figure 17:
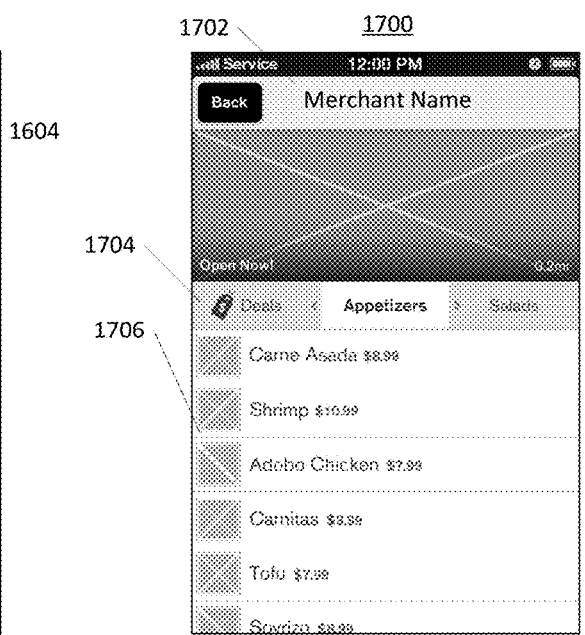

At 1312, the merchant device may be configured to send merchant data to the consumer device. For example, the merchant data may include merchant identifying data, or other data, that indicates the merchant's identity to the consumer device. The merchant data may further include information about the merchant, such as items for sale (e.g., products, services, etc.), promotional deals, promotional vouchers, of the merchant available for purchase, promotional vouchers redeemable at the merchant, sales, etc. FIG. 17 shows an example merchant main display 1700, in accordance with some embodiments. Merchant main display 1700 may be shown on the consumer device at 1312 and may include the merchant data, such as merchant name at 1702, deals at 1704, and items at 1706. In some embodiments, some or all of the merchant data may be stored in central database 2602 and provided to consumer device 2612 via merchant device 2610, as shown in FIG. 26.

Additionally and/or alternatively, the consumer device may access merchant main display 1700 and/or its data via the central system (e.g., at the merchant shop or otherwise). For example, some or all of the merchant data may be provided to consumer device 2612 via network 2608, as shown in FIG. 26. In some embodiments, a consumer may search and/or browse a list for merchants (e.g., using search field 1604 of consumer assistance service menu display 1600). Upon selecting a particular merchant, a merchant main display 1700 for the merchant may be shown on the consumer device. In some embodiments, the merchant data sent from the merchant device at 1312 may include merchant identifying data but no additional merchant information. As such, the consumer device may be configured to request the additional information from the central system based on the merchant identifying data.

At 1314, the merchant device may be configured to establish a secure connection with the central system (e.g., via network 2608 shown in FIG. 26). For example, an employee may provide login data to the central system that may be used to identify and authenticate the employee and/or merchant. As discussed above, the secure connection between the merchant device and the central system may be established at any suitable time, such as before the merchant device has connected with the consumer device at 1308, or before the consumer device enters within communicable proximity to the merchant device. In some embodiments, the merchant device may connect to the central system via a local area network (LAN) (e.g., via one or more wireless routers for mobile devices or Ethernet if the merchant device is wired) that is connected to the Internet. Additionally and/or alternatively, the merchant device may connect to the central system without using a local access point, such as via a mobile broadband connection.

At 1316, the merchant device may be configured to send the wallet identifying data received from the consumer device at 1310 to the central system. For example, the wallet identifying data may be sent via the secure connection established at 1314. As discussed above, the wallet identifying data may be used by the central system to identify the consumer, consumer device, and/or the consumer payment account associated with the consumer.

At 1318, the central system may be configured to validate the consumer, such as by using the wallet identifying data. For example, the central system may determine whether the wallet identifying data sent to the consumer device at 1302 matches or otherwise corresponds with the wallet identifying data received from the merchant device at 1316. In some embodiments, the central system may be configured to ensure that the wallet identifying data received from the merchant device at 1316 originated from a consumer device (e.g., at 1310) that is authorized to use the consumer payment account. As discussed above, authorized consumer devices may include consumer device identifiers that are associated with the wallet identifying at the central system. As such, the consumer device may also be configured to send a consumer device identifier to the merchant device and the merchant device may be configured to send the consumer device identifier to the central system.

In some embodiments, the central system may be configured to extract some or all of the consumer data (e.g., the consumer's identity) from the wallet identifying data (e.g., by using one or more tokens or keys that correspond with the wallet identifying data), such as when the consumer device used the wallet identifying data to encode consumer data or otherwise attached with consumer data with the wallet identifying data.

At 1320, the central system may be configured to send consumer identifying data associated with the wallet identifying data to the merchant device. In some embodiments, the consumer identifying data may include image data, consumer name, a consumer identifier, or the like that may be kept secure by the central system (e.g., rather than being stored in the consumer device and sent over the PAN connection to merchant devices). As discussed above, the association between the wallet identifying data and the consumer identifying data (as well as consumer-related data or other data of the consumer) may be stored in one or more databases (e.g., central database 2602 shown in FIG. 26). As such, the central server may be configured to request the consumer identifying data from the central database based on the wallet identifying data received from the merchant device.

In some embodiments, the merchant device may be configured to receive other types of consumer data or consumer information from the central system at 1320. The consumer data may include, for example, consumer profile data, consumer payment account data, third party account data, purchase history data, social network data, consumer preference data, employee evaluations, consumer history data with respect to employee assistance, promotional vouchers of the merchant available for purchase, promotional vouchers redeemable at the merchant, etc. As will be discussed in further detail below, some or all of the consumer data may be further used to match an employee with the consumer.

Figure 25:

FIG. 25 shows an example consumer information display 2500 that may be shown on the merchant device, in accordance with some embodiments. Consumer information display 2500 may be configured to notify the merchant that a compatible consumer device has been discovered and connected (e.g., at 1304-1308), to provide information about consumers for facilitating customer service, to indicate an order of consumer assistance, to provide POS functionality, and/or to facilitate payments from consumer to employee, among other things. In some embodiments, a notification may also be shown on the merchant device at 1308 to indicate that a consumer device has entered the vicinity of the merchant device (e.g., entered into communicable range) and/or merchant shop even prior to consumer identification.

Consumer entry 2502 may include a display of consumer name at 2504, consumer image at 2506, recommended/favorite items at 2508, preference information at 2510, visit count at 2512, and/or promotional deals/rewards at 2514. Virtually any consumer information associated with the consumer may be shown in consumer information display 2500. In some embodiments, the consumer device may be configured to allow the consumer to set what consumer information is available to the merchant. Additionally and/or alternatively, the merchant device may be configured to allow the merchant to set the types of consumer information that is shown in consumer information display 2500.

In some embodiments, consumers may be listed in consumer information display 2500 based on the proximity of consumer devices to the merchant device. Consumers that are associated with consumer devices that are closer to the merchant device, for example, may be shown near the top of consumer information display 2500, or may otherwise be more readily accessible via consumer information display 2500, than consumers associated with consumer devices that are further from the merchant device. For example, a consumer device may include location tracking and/or location sharing capability. Additionally and/or alternatively, one or more merchant devices may be configured to determine location data for the consumer device based on messages received from the consumer device (e.g., via triangulation). As such, the merchant device can be configured to enable the merchant to show and/or hide various consumer information based on the proximity of the consumer device to the merchant device (using, e.g., real time locating system functionality, triangulation, received signal strength indication, travel-time locating, and/or any other suitable proximity determining functionality). In some embodiments, consumers may be listed in consumer information display 2500 based on their order in a consumer queue or employee queue, as discussed in greater detail below in connection with method 1400.

At 1322, the merchant device may be configured to associate the consumer identifying data received from the central system with employee identifying data. Employee identifying data, as used herein, refers to data that identifies an employee. Additionally and/or alternatively, the employee identifying data may identify a plurality of employees, such as members of a particular group of employees (e.g., clocked-in staff, sales staff, support staff, maintenance staff, sales staff for particular products or locations of a retail store, restaurant servers, cashiers, managers, etc.). As such, the employee identifying data may include a name, image data, a unique identifier, or any other suitable information that can be used to distinguish employees of a merchant.

In some embodiments, the central system may be configured to first associate the consumer identifying data with employee identification data. Next, the central system may send the consumer identifying to a merchant device, which may be but is not necessarily the merchant device that first discovered or otherwise connected with the consumer device at 1304-1308. Here, the order of steps at 1320 and 1322 of method 1300 may be reversed. Such an embodiment may be advantageous for merchants that leverage a plurality of merchant devices that are each associated with one or more different employees.

For example, an employee may login with a merchant device as discussed above in method 200, which may cause the central system to associate the merchant device (e.g., via a merchant device identifier) with the employee identifying data of the employee. As such, after the employee is matched to a consumer, the central system may be configured to send the consumer identifying data to the merchant device associated with the matched employee.

Alternatively and/or additionally, a first merchant device may be configured to send the consumer identifying data associated with the wallet identifying data to a second merchant, where the second merchant device associated with the matched employee. In such embodiments, order of steps at 1320 and 1322 may or may not be reversed. For example, the first merchant device may send consumer identifying data received from the central system at 1320 to the second merchant device after associating the consumer identifying data with the employee identifying data of an employee that is associated (e.g., via login) with the second merchant device. In some embodiments, a central merchant device may be configured to make the connection at 1304-1308, and may then send the consumer identifying data to a device associated with the matched employee.

Returning to FIG. 13, at 1324, the merchant device may be configured to send the employee identifying data and/or employee profile data to the consumer device. The consumer device may be configured to provide a display of the employee identifying data and/or employee profile data. As such, the consumer may be given profile information about the employee, such as the employee's name, image, background information, interests, etc. Virtually any information that the employee and/or merchant deems suitable may be sent the consumer device.

Figure 18:
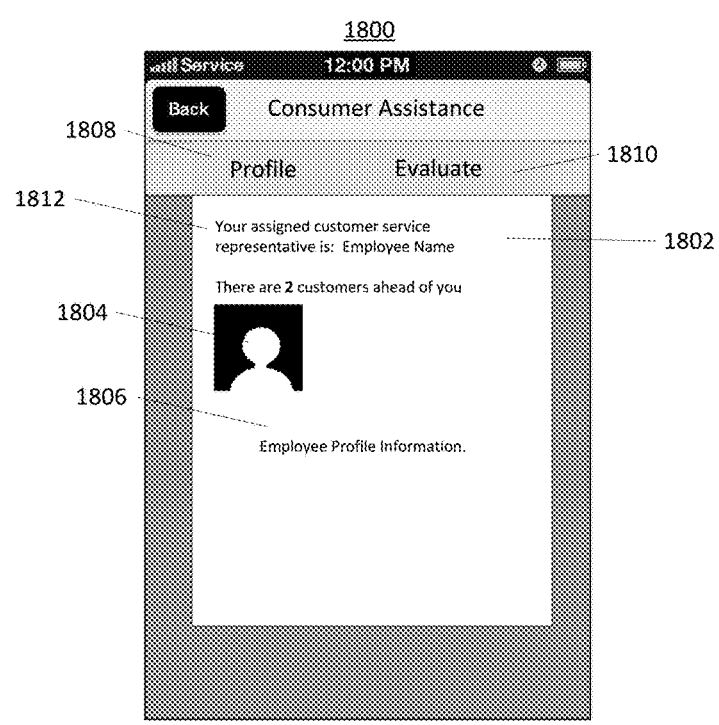

At 1326, the consumer device may be configured to display, such as on a display device, the employee identifying data and/or employee profile data. FIG. 18 shows an example consumer assistance display 1800, in accordance with some embodiments. Consumer assistance display 1800 may include the employee identifying data and/or employee profile data. For example, the name of the employee may be shown at 1802, an image of an associated employee may be shown at 1804 and profile information may be shown at 1806, such as upon selecting profile selection 1808. Furthermore, the consumer device may be allowed to provide an evaluation of the employee by selecting evaluation selection 1810. Method 1300 may then end.

FIG. 14 shows a flow chart of an example method 1400 for matching an employee with a consumer, performed in accordance with some embodiments. As such, method 1400 may be performed to associate consumer identifying data with employee identifying data, as discussed above at 1322 of method 1300. In some embodiments, the merchant device may be configured to receive consumer data used for the matching from the central system at 1320 of method 1300 and may be further configured to perform the matching. However, some or all of the steps of method 1400 may be performed by the central system. Furthermore, other systems or devices may be used. As such, method 1400 is discussed herein as being performed by the merchant device for clarity, but is not so limited.

Method 1400 may begin at 1402 and proceed to 1404, where the merchant device may be configured to track service availability for employees. Service availability, as used herein, refers to the availability of an employee to assist a consumer. For example, a merchant may have numerous employees with only a subset of all employees at work at any given time. As discussed above, the merchant device may be configured to allow employees to log in for access to an employee payment account, which in some embodiments, may also be used to indicate employee time-in. Similarly, the merchant device may be configured to allow employees to log out of access to the employee payment account, which in some embodiments, may also be used to indicate employee time-out. As such, the merchant device may be configured to track service availability such that only employees that are time-in are assigned to assist consumers.

In some embodiments, an employee may be associated with an employee queue that includes a list of consumers assigned to the employee. For example, the employee may assist a consumer at the top of the queue and the consumer may be removed from the queue when the assistance is completed. As such, the merchant device may be configured to determine which employees have a long queue of consumers and may assign consumers to the queue of employees with shorter lists to facilitate quicker consumer assistance.

In some embodiments, consumers may be first placed into a consumer queue that includes a list of consumers to be assisted by employees in general. As such, consumers may be assigned to a place in a virtual line prior to being assigned to any employee and/or employee queue. The use of queues may be advantage in environments, for example, where customers would otherwise be required to form a physical line or to take a ticket for assistance.

In some embodiments, a consumer (e.g., via the consumer device) may be placed into an employee queue and/or consumer queue upon entering the proximity of a merchant device, upon requesting assistance, etc. In some embodiments, the consumer device may be configured to receive and display the order of the consumer in the employee queue and/or consumer queue, as shown in FIG. 18 at 1812 in consumer assistance display 1800.

At 1406, the merchant device may be configured to determine consumer preference data indicating a preference for a particular employee and/or employee type. Consumer preference data, like other types of data discussed in connection with Method 1400 may be received from the central system as discussed above. Additionally or alternatively, such data could be received from the consumer device (e.g., via the direct connection) or may be entered by a merchant utilizing the merchant device.

The preference data may indicate a preference for a particular employee. For example, the consumer may be familiar with a particular employee (e.g., through past interactions at the merchant, from viewing an online employee profile, via a personal relationship, or the like) and may indicate a preference for such an employee, such as via the consumer device.

Additionally and/or alternatively, the consumer preference data may indicate a preference for a particular employee type. For example, the consumer may indicate (e.g., via the consumer device) the nature of assistance that is desired. In the context of a retail store, for example, the consumer device may send a message to the merchant device that indicates that the consumer is shopping for a laptop. As such, employees having expertise in the indicated offering may be a better match for the consumer. In another example, the consumer may have a particular issue that should be addressed by a manager or supervisor, such as complaints, suggestions, etc.

In some embodiments, the consumer preference data may indicate a preference for particular skills of employees or service level. For example, an employee at a salon may be highly skilled at performing massages but be unskilled at performing manicures. The service level may indicate that the consumer is interested in massages and an employee may be assigned accordingly. Employees may be ranked based on skills and assigned to consumers based on their preference, interest or need with respect to the skills In another example, an employee who speaks Spanish may be ranked highly for Spanish speaking customers.

At 1408, the merchant device may be configured to determine consumer history data indicating prior interaction with an employee. For example, the merchant device (or central system), may be configured to record associations of an employee with a consumer. Particular employees may be matched with particular consumers over multiple interactions. As such, some embodiments may facilitate continuity of service, development of personal relationships between employees and consumers, or the like.

At 1410, the merchant device may be configured to determine the location of the consumer device within the merchant shop. The location of the consumer device may be determined based on any communication between the merchant device(s) and the consumer device such as via the PAN connection, radio frequency identification, wireless local area network, etc. For example, if the consumer device is in a particular aisle or section of a retail shop, this may indicate that the consumer is interested in a particular type or product or service. Consumer preference for a particular type of assistance, as discussed above, may also be used to match employees with a particular expertise or role. Additionally and/or alternatively, employees may be assigned based on their proximity to the consumer device. As such, faster response time for consumer assistance may be achieved.

At 1412, the merchant device may be configured to determine a prior evaluation of an employee or employees by the consumer. As discussed below in greater detail in method 1400, the consumer device may be configured to send an employee evaluation of an employee, such as upon completion of being assisted by the employee. As such, an employee that receives a positive employee evaluation may be associated with the consumer for subsequent service. An employee that receives a negative employee evaluation may be disassociated or otherwise recorded such that the same employee is not matched with the consumer when possible or appropriate.

At 1414, the merchant device may be configured to match an employee with a consumer. For example, the determinations discussed above at 1404-1412 may be used as to perform the matching. At least one or all of these determinations may be performed. In some embodiments, the merchant device may be configured to prioritize which of the determinations have greater priority in the matching. For example, an employee that has prior interaction with a consumer may not be matched with the consumer if the employee does not have service availability and/or is not suited for a particular type of assistance. The merchant device may be configured to set which determinations should be used for the matching, their priority, and/or be allowed to create customized rules that are appropriate for a particular merchant's business. Method 1400 may then end at 1416.

Employee Payments by Consumer Device

FIG. 15 shows a flow chart of an example method 1500 for facilitating transactions between a consumer and an employee, performed in accordance with some embodiments. Method 1500 may be performed after method 1400, where an employee indicated by employee identifying data has been associated with a consumer indicated by consumer identifying data.

Method 1500 may begin at 1502, where the consumer device may be configured to determine an employee payment amount. The employee payment amount, as used herein, refers to amount that is to be paid to an employee (e.g., to an employee payment account). In some embodiments, the consumer device may be further configured to determine a merchant payment amount at 1502. As such, some embodiments described herein provide for payments to both merchants and their employees via the consumer device.

In some embodiments, the merchant device may be configured to send transaction data (which may include the payment amount) to the consumer device. For example, the merchant may be a restaurant where an employee uses a merchant device to take orders and/or generates a restaurant tab that includes a merchant payment amount (e.g., a total cost of ordered menu items). The merchant payment amount may be sent to the consumer device (e.g., at the time of payment, such as in the form of the transaction data) and the consumer device may be configured to allow the consumer to enter the employee payment amount (e.g., a tip) to the employee in addition to the merchant payment amount paid to the merchant (e.g., to a merchant payment account configured to receive payments).

In another example, the consumer may walk into a retail store while carrying the consumer device. After picking out items (e.g., products or services) for purchase, the consumer device may receive the merchant payment amount (which may include or be limited to, among other things, a total cost of the items) from the merchant device and/or from one or more input components coupled thereto (e.g., a barcode scanner, RFID reader, magnetic stripe reader, user keypad, touchscreen display, selectable menu, etc.). As such, the merchant device may be configured to receive product identifying data for items (e.g., via barcode scanning or other input techniques), to determine the merchant payment amount for the items, and to send the merchant payment amount and/or product identifying data to the merchant device prior to 1502 (not shown in FIG. 15 to avoid unnecessarily overcomplicating the disclosure). For example, the merchant device may be a POS device configured to allow the employee to select a consumer from consumer information display 2500, which may allow the employee to associate one or more items with the consumer to generate a shopping list. Additionally and/or alternatively, self-checkout techniques may be used where the consumer device generates the merchant payment amount (e.g., using a barcode scanner, magnetic stripe reader, RFID reader user keypad, touchscreen display, etc. coupled to the consumer device).

In some embodiments, the consumer device may be configured to determine the employee payment amount at 1502 independent of any merchant payment amount. For example, with the growing popularity of online shopping, merchants may increasingly leverage brick-and-mortar shops for advertising, demonstration, sampling, and in-person inspection purposes in lieu of (or in addition to) point-of-sale purposes. Consumers of electronics and other big-ticket items typically invest time in becoming more sophisticated regarding product prices or features prior to a purchase. Some products may need to be tried for personal fit (e.g., clothing, shoes, glasses, etc.), while at the same time may, be cheaper or otherwise preferable to purchase online. As such, the consumer device may be configured to determine the employee payment amount (e.g., via consumer input) as a way of compensating an employee for sharing their time, knowledge, or the like even though the consumer does not make any purchases at the merchant's shop.

In some embodiments, the merchant device may be configured to allow the merchant to select from a plurality of payment types. For example, the merchant may ask the consumer how the consumer would like to pay. The consumer may decide, for example, to pay by cash, credit card or otherwise without using the consumer device. As such, the merchant device may be further configured to accept alternative forms of payment. If the consumer decides to pay via the consumer device, the merchant may so indicate by selecting a pay-by-consumer device selection on the merchant device (e.g., via a graphical user interface), which may cause the merchant device to send the payment amount to the consumer device.

At 1504, the consumer device may be configured to generate consumer approval data secured with wallet identifying data. In some embodiments, the consumer approval data may include an electronic signature created based on the private key associated with the wallet identifying token (e.g., the wallet identifying token sent to the merchant device at 1310 of method 1300). "Consumer approval data," as used herein, refers to data that is configured to provide an indication that the consumer has approved the payment and may refer to transaction data (e.g., sent by the merchant device) that is signed or otherwise secured using a private key.

In some examples, the consumer approval data, taking the form of an electronic signature, may be generated by using an algorithmic transformation, such as hashed (e.g., using cryptographic hash functions such as SHA-1). In one embodiment, the electronic signature created using the private key associated with the wallet identifying token may be a hash of the private key and at least some portion of the payment data. For example, the consumer approval data may be sent to the merchant device via one or more messages that may also include transaction data (e.g., merchant payment amount, employee payment amount, total payment amount, time of transaction, location, tip etc.) and/or the additional indication of consent. In examples, where a tip or other value is added, the consumer device may include an indication of the tip, an additional authorization or may otherwise cause an indicated tip to be added to the transaction data or otherwise provided to the merchant device (e.g., for approval) and ultimately to the control system. In some embodiments, the consumer approval data may include consumer data (e.g., consumer name, payment source information, payment account identification, etc.).

Alternatively or additionally, in some embodiments, at least one of the one or more messages may be encrypted using the wallet identifying token. As discussed above, the wallet identifying token may be a public key for encryption with an associated private key for decryption that is stored in the central system. Alternatively and/or additionally, at least one of the one or more messages (hashed or otherwise) may be signed using the wallet identifying token. For example, the wallet identifying token may be appended or otherwise included with a message to ensure the authenticity of the message (e.g., that the message was received from the consumer device). In some embodiments, both signing and encryption may be used.

In some embodiments, the one or more messages (encrypted, signed, hashed or otherwise) may be formatted with JavaScript Object Notation (JSON), where each piece of data is associated with a field. For example, an encrypted, hashed and/or signed message (e.g., in any order) may be included within a field as specified by the JSON format. Alternatively, unsecured messages may be formatted with JSON and then the formatted massage may be hashed, encrypted and/or signed (e.g., in any order).

Figures 19, 20:

In some embodiments, at 1504, the consumer device may be further configured to determine whether to approve the employee payment amount. In some embodiments, approving the payment may include generating an indication of approval. FIG. 19 shows an example payment approval display 1900 that may be shown on the consumer device that includes an employee payment amount and a merchant payment amount. Payment approval display 1900 may include sub-total display 1902, tip display 1904 (e.g., the employee payment amount), tax display 1906 and total amount display 1908. Furthermore, the consumer may select shopping list selection 1914 to view a listing of items (e.g., the one or more items whose price data provides a basis for the sub-total).

Via payment approval display 1900, the consumer device may be configured to allow the consumer to select the employee payment amount. For example, the consumer may select a tip percentage using tip selection 1910. Responsive to a tip selection, tip display 1906 and total amount display 1908 may be updated to reflect the new tip and total amounts.

As discussed above, some embodiments may allow for payments to an employee without a payment to the merchant. For example, the consumer may tip an employee for service regardless of whether the consumer makes a purchase from the merchant. As such, payment approval display 1900 may be configured to allow the consumer to enter the employee payment amount as a currency value, or the like, rather than a percentage of the merchant payment amount.

If the consumer is satisfied with the payment, the consumer may select approve payment selection 1912 to indicate approval of the payment. Additionally and/or alternatively, the consumer device may be configured to allow and/or require the user to provide an additional indication of consent. For example, the consumer may be prompted to select a box (e.g., a checkbox that indicates consent), provide login data, generate a signature (e.g., via a touch sensitive device such as a touch sensor), enter a pin number, and/or provide a biometric identifier (e.g., a fingerprint, voice message, retina scan, behavioral identifier, etc.). If the consumer is not satisfied with the payment amount or otherwise does not approve of the payment, the consumer may select cancel order selection 1916.

In some embodiments, the consumer device may be configured to automatically approve the employee payment amount and/or merchant payment amount based upon satisfaction of one or more trigger conditions. As such, the consumer device may be configured to allow the consumer to preapprove payments (e.g., in the form of a predetermined employee payment amount and/or as tip percentage), such as even prior to coming within proximity to the merchant device as discussed in method 1300.

For example, the identity of the merchant may serve as a trigger condition for automatic payment in some embodiments. The consumer may be allowed to add one or more merchants to an approved merchant list, such as via communications with the central system. As such, upon receiving a payment request for a merchant and/or employee of the merchant on the approved merchant list, the consumer device may be configured to automatically generate and send the payment approval data to the merchant device. The merchant list may be stored on the consumer device and/or the central system. In some embodiments, the consumer device may be configured use the merchant data received from the merchant device at 1312 of method 1300 to determine whether the merchant is on the approved merchant list.

In some embodiments, the location of the consumer device may serve as a trigger condition for automatic payment. For example, the consumer device may be configured to allow the consumer to simply walk out of the store after being assisted by the merchant. The location of the consumer device may be tracked such that the payment approval data is sent to the merchant device when the consumer leaves the merchant, is a certain distance from a merchant device, drops out of communicable range with the merchant device, etc.

In some embodiments, reception of the employee payment amount and/or the merchant payment amount by the consumer device may serve as a trigger condition for automatic payment. Combinations of one or more trigger conditions may be used. For example, the consumer device may be configured to send the payment approval data only to merchants on the approved merchant list upon receiving the employee payment amount from a merchant device of the approved merchant. Other example trigger conditions may include merchant device location, merchant type (e.g., retailers, restaurants, etc.), the total cost amount (e.g., automatically approve payments below a specified amount), a per-day cost threshold (e.g., up to $100 per day can be automatically approved), etc.

In some embodiments, the consumer device may be configured to allow a consumer to set automatic approvals on or off. Additionally and/or alternatively, a consumer may specify that only certain types of transactions require approval. In another example, approval for an initial payment may be required at a merchant, but not for subsequent payments. Similarly, an approved merchant may be removed or otherwise set such that the next and/or every transaction with the merchant require manual approved.

In some embodiments, the merchant device may be configured to set whether to allow automatic payment approval by consumers based on one or more trigger conditions. For example, the merchant device may specify that all payments require manual approval, payments from certain consumers require manual approval, or payments above a certain threshold amount require manual approval, etc.

Returning to FIG. 15, the consumer device may be configured to send the consumer approval data to the merchant device at 1506. The consumer approval data may be safely sent via the PAN connection between the merchant device and the consumer device. For example, where the wallet identifying token and/or private key based electronic signature was used to secure the payment approval data, only a device that includes the corresponding private key for the wallet identifying token (e.g., the central system) will be able to validate or otherwise use the consumer approval data.

At 1508, the merchant device may be configured to send secured payment approval data to the central system. In some example embodiments, the secured payment approval data is a combination or other association of the consumer approval data and the transaction data (e.g., originally sent to the consumer device). In some examples, the consumer approval data may take the form of the secured payment approval data and, in such embodiments, the merchant device may function as a pass through device.

In some embodiments, the secured payment approval data may include the consumer approval data and a total amount (e.g., the merchant payment amount sent to the consumer device with the transaction data plus the employee payment amount amount added by the consumer). As such, the consumer device may be configured to update the transaction data after it is received from the merchant device to include the employee payment amount, then create the consumer approval data by electronically signing the updated transaction data. The consumer device may then send the updated transaction data with the consumer approval data back to the merchant device. In some embodiments, the merchant device may be configured to check the updated transaction data to ensure that the total payment amount is greater than the merchant payment amount.

In some embodiments, the merchant device may be further configured to send employee identifying data of the employee to receive the employee payment amount to the central system at 1508. The central system may use the employee identifying data to identify the employee payment account that is to receive the payment. Alternatively and/or additionally, a merchant device identifier may be sent that identifies a particular merchant device. For example, an employee payment account may be identified via the merchant device identifier if the employee has logged in with the central system via the merchant device. In some embodiments, the employee identifying data may be part of the transaction data and/or consumer approval data.

At 1510, the central system may be configured to validate and/or process the payment. For example, the central system may decode and/or otherwise authenticate the secured payment approval data received from the merchant device. Where encryption was used to secure the payment approval data with the wallet identifying data, the central system may be configured to decrypt the payment approval data with a corresponding private key.

In some embodiments, where an electronic signature using the private key was used, the central system may be configured to determine the private key associated with the wallet identifying token received at 1310 of method 1300. As discussed above, the central system may be configured to generate the wallet identifying token with an associated private key. For example, each private key may be stored in one or more central databases at the central system and referenced via their associated wallet identifying tokens. As such, the central system may be configured to request the private key associated with the wallet identifying token that was used the consumer device from one or more databases. Next, the central system may be configured to validate the secured payment approval data by generating or otherwise re-creating the received electronic signature using the private key. In some embodiments, the central system may be configured to recreate the consumer approval data using the transaction data and the private key, and then performing a one-way hash (e.g., using the same technique used to by the consumer device). If the recreated secured payment approval data matches the received secured payment approval data from the merchant device, the payment may be validated. In one embodiment, the central system recreates the received electronic signature by using the private key to create a hash value for a least a portion of the secured payment approval data.

In some embodiments, processing the payment may further include communicating with one or more payment processing servers, third party servers, credit card servers, bank account servers, and/or any other type of financial transaction server that may be suitable to complete the financial transaction. For example, the central system may send transaction data to one or more third party servers and receive an indication as to whether the financial transaction was successful.

At 1512, the central system may be configured to send a payment confirmation to the merchant device. For example, the payment confirmation may indicate whether the payment was successfully processed. An indication may be shown on the merchant device to alert the merchant. For example, if the payment was not successful, the merchant may request that the consumer provide an alternate form of payment and/or to resubmit the payment via the consumer device.

At 1514, the central system may be configured to send a receipt for the payment to the merchant device, which may then be sent to the consumer device at 1516 via the PAN connection. As such, the consumer device does not need an active connection to the central system to receive the receipt. The receipt may alternatively, and/or additionally, be sent directly to the consumer device, such as when a direct connection to the consumer device is available.

FIG. 20 shows an example receipt display 2000, in accordance with some embodiments. Receipt display 2000 may be shown on the consumer device to provide an indication to the consumer that the financial transaction was successfully. As such, receipt display 2000 may include transaction data at 2002 and payment confirmation display 2004, confirming payment via the consumer device.

FIG. 21 shows a receipt notification display 2100 that may be additionally and/or alternatively shown on the consumer device. For example, receipt notification display 2100 may be popup notification that may be presented on the consumer device, even when the consumer device is locked or executing the consumer assistance service in the background. Receipt notification display 2100 may include notification selection 2102 that includes transaction price indicator 2104 and merchant indicator 2106. In some embodiments, displays providing more detailed receipt information may be shown on the consumer device responsive to the consumer selecting notification selection 2102.

FIG. 22 shows an example receipt listing display 2200, in accordance with some embodiments. Receipt listing display 2200 may be configured to provide a listing of receipts associated with the consumer payment account. Receipt listing display 2200 may be accessed, for example, by selecting receipts selection 1606 in consumer assistance service menu display 1600. As shown, a listed receipt (e.g., listed receipt 2202) may include a display of merchant image 2204 (e.g., a trademark, symbol, slogan, icon, graphic, photograph, etc.), merchant name 2206, transaction date 2208 and/or amount paid 2210. The receipts may be listed based on virtually any ordering criteria, such as the transaction date or merchant name, in some example embodiments.

In some embodiments, receipts may be searchable. For example, a consumer may enter search criteria (e.g., merchant name or transaction date as shown in FIG. 2200) in receipt search 2212. Responsive to entering the search, the consumer device may show a listing of receipts that fit, or come closest to fitting, the search criteria.

In some embodiments, the listed receipts in receipt listing display 2200 may be selectable. Upon selecting a listed receipt, additional information about the receipt may be shown on the consumer device. For example, upon selecting listed receipt 2202, the consumer device may be configured to show receipt display 2300. The discussion above regarding receipt display 2000 may be applicable to receipt display 2300. In some embodiments, receipt display 2300 may alternatively and/or additionally include payment source identifier 2302. As shown in FIG. 23, payment source identifier 2302 indicates that the payment was made with a credit card account having a credit card number ending with 2345 and a December 2015 expiration date.

In some embodiments, the consumer device may be configured to allow the consumer to view items associated with the receipt. For example, the consumer may select receipt item selection 2304 in receipt display 2300. FIG. 24 shows an example view receipt items display 2400 that includes receipt items listing 2402. As shown, receipt items listing 2402 may include a list of items and associated price data.

Returning to FIG. 15, the merchant device may be configured to send a request for an employee evaluation at 1518. The employee evaluation may include, for example, one or more questions regarding the interaction between the employee and the consumer. As such, questions may be directed to the employee's expertise or qualification in providing the assistance, the employee's helpfulness, manners, attitude, etc. Questions regarding any aspect of the interaction that may be important or useful to merchants and/or consumers may be sent to the consumer device, such as whether the consumer was pleased with the interaction (e.g., either via a yes or no question or via rating on a scale).

At 1520, the consumer device may be configured to send employee evaluation data to the merchant device. In some embodiments, the employee evaluation data may further be encoded (e.g., with wallet identifying data or some other type of data) or be otherwise inaccessible such that the employee (or other unauthorized user) may not access the employee evaluation data in a readable format. The discussion above regarding encoding and/or signing of the payment approval data may be applicable to the employee evaluation and associated employee evaluation data. In some embodiments, the employee evaluation data may not be secured to save computing resources.

At 1522, the merchant device may be configured to send the employee evaluation data to the central system. In some embodiments, such as where a direct connection between the consumer device and the central system is available, the consumer device may be configured to alternatively and/or additionally directly send the employee evaluation data to the central system.

At 1524, the central system may be configured to validate, process, and/or store the employee evaluation data. Where the employee evaluation data was encrypted and/or signed with wallet identifying data, the central system may be configured to decrypt and/or authenticate the employee evaluation data. Furthermore, the central system may be configured to process the employee evaluation data for a variety of purposes such as in subsequent matching of employers and consumers, as discussed above in method 1400. For example, the employee evaluation data may be used for generating consumer history data indicating prior interaction with the employee, associating and/or disassociating employees and consumers, determining consumer preferences, etc. In another example, the employee evaluation data may be used for analytic purposes to determine, for example, employee performance with respect to consumer satisfaction.

In some embodiments, the merchant device (or some other merchant device) may be configured to perform the processing and storing of the employee evaluation data. Such embodiments may be used, for example, where the employee evaluation data is not secured or encrypted in a manner accessible only to the central system. For example, merchants, consumers and/or employees may not be as concerned with the unauthorized access of the employee evaluation data as compared with consumer data or financial data. Here, some embodiments of the merchant device that received the employee evaluation data at 1520 may be configured such that the employee evaluation data is not displayed on the merchant device (e.g., at 1522 so that employees cannot readily view the employee evaluation data) but is otherwise unsecured for later use (e.g., at 1524), such as by a manager or administrator. Method 1500 may then end.

Exemplary System Architecture

FIG. 26 shows system 2600 including an example network architecture, which may include one or more devices and sub-systems that are configured to implement some embodiments discussed herein. For example, system 2600 may include central system 2602, which can include, for example, central server 2604 and central database 2606, among other things (not shown). Central server 2604 may be any suitable network server, a plurality of networked servers, and/or other type of processing device. Central database 2606 may be any suitable network database configured to store information that may be used to facilitate the techniques as discussed herein. In this regard, system 2602 may include, for example, at least one backend data server, network database, cloud computing device, among other things.

Central system 2602 may be coupled to one or more merchant devices (e.g., merchant device 2610) via network 2608. In this regard, network 2608 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 2608 may include a cellular telephone, an 802.11, 802.16, 802.20, and/or WiMax network. Further, the network 2608 may include a public network, such as the Internet, a private network, such as an intranet, or combinations thereof, and may utilize a variety of networking protocols now available or later developed including, but not limited to TCP/IP based networking protocols.

As discussed above, merchant device 2610 may be associated with a merchant, such as a retail store, restaurant, etc. or one or more employees of the merchant. In some embodiments, merchant device 2610 may be a POS device that is configured to receive payments at the merchant's shop. As such, merchant device 2610 may include a personal computer and/or other networked device, such as a cellular phone, tablet computer, mobile device, etc., that may be used for any suitable purpose in addition to providing POS functionality at the restaurant.

System 2600 may further include one or more consumer devices (e.g., consumer device 2612). Consumer device 2612 may connect with merchant device 2610 via network 2608 and/or PAN network 2616. As such, consumer device 2612 may be configured to make communicate with merchant device 2610 via PAN network 2616 even if consumer device 2612 and/or merchant device 2610 do not have active connections with network 2608.

In some embodiments, central system 2600 may further include one or more third party systems (e.g., third party system 2614), among other things. In some embodiments, different third party systems may be associated with different types of payment sources or payment destinations. Thus for each payment source or destination, data may be sent to an appropriate third party system (e.g., a credit card transaction server, a bank account, etc.) to validate and/or process payments. Furthermore, as discussed above, employee payment accounts and/or consumer payment accounts may be associated with one or more third party accounts that are provided by third party system 2614.

In some embodiments, central system 2602 may be a multi-tenant database system configured to provide services to a plurality of consumers and merchants. Additionally and/or alternatively, central system 2602 may be configured to include, or work in connection with, online ordering systems (e.g., shop online and pickup), promotional systems (e.g., deal voucher accounts, offerings, purchases, and redemptions, where the value of a redeemed voucher may be deducted from the payment), merchant systems (e.g., kitchen systems for restaurants), and/or appointment systems (e.g., scheduling a reservation at a restaurant). As such, the techniques disclosed herein may be applicable to any environment that involves consumer and employee interactions.

FIG. 27 shows a schematic block diagram of circuitry 2700, some or all of which may be included in, for example, central system 2604, consumer device 2612, and/or merchant device 2610. In accordance with some example embodiments, circuitry 2700 may include various means, such as one or more processors 2702, memories 2704, communications modules 2706, and/or input/output modules 2708.

In some embodiments, such as when circuitry 2700 is included in merchant device 2710 and/or central system 2702, payment/redemption module 2710 may also or instead be included. As referred to herein, "module" includes hardware, software and/or firmware configured to perform one or more particular functions. In this regard, the means of circuitry 2700 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2704) that is executable by a suitably configured processing device (e.g., processor 2702), or some combination thereof.

Processor 2702 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 27 as a single processor, in some embodiments, processor 2702 comprises a plurality of processors. The plurality of processors may be embodied on a single computing device or may be distributed across a plurality of computing devices collectively configured to function as circuitry 2700. The plurality of processors may be in operative communication with each other and may be collectively configured to perform one or more functionalities of circuitry 2700 as described herein. In an example embodiment, processor 2702 is configured to execute instructions stored in memory 2704 or otherwise accessible to processor 2702. These instructions, when executed by processor 2702, may cause circuitry 2700 to perform one or more of the functionalities of circuitry 2700 as described herein.

Whether configured by hardware, firmware/software methods, or by a combination thereof, processor 2702 may comprise an entity capable of performing operations according to embodiments of the present invention while configured accordingly. Thus, for example, when processor 2702 is embodied as an ASIC, FPGA or the like, processor 2702 may comprise specifically configured hardware for conducting one or more operations described herein. As another example, when processor 2702 is embodied as an executor of instructions, such as may be stored in memory 2704, the instructions may specifically configure processor 2702 to perform one or more algorithms and operations described herein.

Memory 2704 may comprise, for example, volatile memory, non-volatile memory, or some combination thereof. Although illustrated in FIG. 27 as a single memory, memory 2704 may comprise a plurality of memory components. The plurality of memory components may be embodied on a single computing device or distributed across a plurality of computing devices. In various embodiments, memory 2704 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2704 may be configured to store information, data, applications, instructions, or the like for enabling circuitry 2700 to carry out various functions in accordance with example embodiments discussed herein. For example, in at least some embodiments, memory 2704 is configured to buffer input data for processing by processor 2702. Additionally or alternatively, in at least some embodiments, memory 2704 may be configured to store program instructions for execution by processor 2702. Memory 2704 may store information in the form of static and/or dynamic information. This stored information may be stored and/or used by circuitry 2700 during the course of performing its functionalities.

Communications module 2706 may be embodied as any device or means embodied in circuitry, hardware, a computer program product comprising computer readable program instructions stored on a computer readable medium (e.g., memory 2704) and executed by a processing device (e.g., processor 2702), or a combination thereof that is configured to receive and/or transmit data from/to another device, such as, for example, a second circuitry 2700 and/or the like. In some embodiments, communications module 2706 (like other components discussed herein) can be at least partially embodied as or otherwise controlled by processor 2702. In this regard, communications module 2706 may be in communication with processor 2702, such as via a bus. Communications module 2706 may include, for example, an antenna, a transmitter, a receiver, a transceiver, network interface card and/or supporting hardware and/or firmware/software for enabling communications with another computing device. Communications module 2706 may be configured to receive and/or transmit any data that may be stored by memory 2704 using any protocol that may be used for communications between computing devices. Communications module 2706 may additionally or alternatively be in communication with the memory 2704, input/output module 2708 and/or any other component of circuitry 2700, such as via a bus.

Input/output module 2708 may be in communication with processor 2702 to receive an indication of a user input and/or to provide an audible, visual, mechanical, or other output to a user. Some example visual outputs that may be provided to a user by circuitry 2700 are discussed in connection with the displays described above. As such, input/output module 2708 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 2700 is embodied as a server or database, aspects of input/output module 2708 may be reduced as compared to embodiments where circuitry 2700 is implemented as an end-user machine (e.g., consumer device and/or merchant device) or other type of device designed for complex user interactions. In some embodiments (like other components discussed herein), input/output module 2708 may even be eliminated from circuitry 2700. Alternatively, such as in embodiments wherein circuitry 2700 is embodied as a server or database, at least some aspects of input/output module 2708 may be embodied on an apparatus used by a user that is in communication with circuitry 2700, such as for example, merchant device 2710 and/or consumer device 2712. Input/output module 2708 may be in communication with memory 2704, communications module 2706, and/or any other component(s), such as via a bus. Although more than one input/output module and/or other component can be included in circuitry 2700, only one is shown in FIG. 27 to avoid overcomplicating the drawing (like the other components discussed herein).

Payment/redemption module 2710 may also or instead be included and configured to perform the functionality discussed herein related to facilitating payment transactions discussed above. In some embodiments, some or all of the functionality facilitating payment transactions may be performed by processor 2702. In this regard, the example processes and algorithms discussed herein can be performed by at least one processor 2702 and/or payment/redemption module 2710. For example, non-transitory computer readable storage media can be configured to store firmware, one or more application programs, and/or other software, which include instructions and other computer-readable program code portions that can be executed to control processors of the components of system 2700 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

It is also noted that all or some of the information presented by the example displays discussed herein can be based on data that is received, generated and/or maintained by one or more components of system 2600. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2702 and/or payment/redemption module 2710 discussed above with reference to FIG. 27, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2704) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the central system. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A merchant device for securely identifying consumer devices for programmatic matching with an employee payment account, comprising processing circuitry configured to:
    wirelessly receive wallet identifying data from a consumer device via a direct wireless connection when the consumer device is within a direct wireless communicable range with the merchant device;
    transmit the wallet identifying data to a central system via a secure connection separate from the direct wireless connection;
    in response to transmitting the wallet identifying data:
        receive, from the central system and via the secure connection, consumer identifying data that identifies a consumer associated with the wallet identifying data; and
        receive, from the central system and via the secure connection, consumer preference data indicative of a preference for a particular employee skill and service level, particular employee identifying data, or an employee type;
    track employee service availability, employee service availability being indicative of an availability of an employee to assist a consumer;
    determine a ranking of employees for the consumer based at least in part on the employee service availability and the consumer preference data;
    match the employee payment account associated with a selected employee with the consumer based on the ranking of employees by identifying the employee payment account configured to receive payments that is associated with the selected employee; and
    subsequent to matching the employee payment account associated with the selected employee with the consumer, associate employee identifying data that identifies the employee payment account associated with the selected employee with the received consumer identifying data.

2. The merchant device of claim 1, wherein the processing circuitry is further configured to:
    wirelessly receive, from the consumer device, consumer approval data indicating approval of a payment of an employee payment amount to the employee payment account; and
    send the consumer approval data to the central system.

3. The merchant device of claim 2, wherein the consumer approval data is secured by the consumer device using the wallet identifying data.

4. The merchant device of claim 1, wherein the processing circuitry is further configured to wirelessly send employee profile information of the selected employee to the consumer device.

5. The merchant device of claim 1, wherein the processing circuitry is further configured to receive a selection of the selected employee from the consumer device.

6. The merchant device of claim 1, wherein the processing circuitry is further configured to:
    in response to transmitting the wallet identifying data, receive, from the central system and via the secure connection, consumer history data indicating prior interaction with the selected employee; and
    determine the ranking of employees based on the consumer history data.

7. The merchant device of claim 1, wherein the processing circuitry is further configured to:
    determine location data based on a communication received from the consumer device indicating a location of the consumer device within a merchant shop; and
determine the ranking of employees based on the location data.

8. The merchant device of claim 1, wherein the processing circuitry is further configured to determine the ranking of employees based on one or more prior employee evaluations of the selected employee.

9. A method for securely identifying consumer devices for programmatic matching with an employee payment account, comprising:
    wirelessly receiving wallet identifying data from a consumer device via a direct wireless connection when the consumer device is within a direct wireless communicable range with the merchant device;
    transmitting the wallet identifying data to a central system via a secure connection separate from the direct wireless connection;
    in response to transmitting the wallet identifying data:
        receiving, from the central system and via the secure connection, consumer identifying data that identifies a consumer associated with the wallet identifying data; and
        receiving, from the central system and via the secure connection, consumer preference data indicative of a preference for a particular employee skill and service level, particular employee identifying data or an employee type;
    tracking employee service availability, employee service availability being indicative of an availability of an employee to assist a consumer;
    determining a ranking of employees for the consumer based at least in part on the employee service availability and the consumer preference data;
    matching the employee payment account associated with a selected employee with the consumer based on the ranking of employees; and
    subsequent to matching the selected employee with the consumer, associating employee identifying data that identifies the employee payment account associated with the selected employee with the received consumer identifying data.

10. The method of claim 9, further comprising:
wirelessly receiving, from the consumer device, consumer approval data indicating approval of a payment of an employee payment amount to the employee payment account; and
sending the consumer approval data to the central system.

11. The method of claim 10, wherein the consumer approval data is secured by the consumer device using the wallet identifying data.

12. The method of claim 9 further comprising wirelessly sending employee profile information of the selected employee to the consumer device.

13. The method of claim 9 further comprising receiving a selection of the selected employee from the consumer device.

14. The method of claim 9 further comprising:
in response to transmitting the wallet identifying data, receiving, from the central system and via the secure connection, consumer history data indicating prior interaction with the selected employee; and
determine the ranking of employees based on the consumer history data.

15. The method of claim 9 further comprising:
determining location data based on a communication received from the consumer device indicating a location of the consumer device within a merchant shop; and
determining the ranking of employees based on the location data.

16. The method of claim 9 further comprising determining the ranking of employees based on one or more prior employee evaluations of the selected employee.

17. A system for securely identifying consumer devices for programmatic matching with an employee payment account, comprising:
a merchant device comprising processing circuitry configured to:
wirelessly receive wallet identifying data from a consumer device via a direct wireless connection when the consumer device is within a direct wireless communicable range with the merchant device;
transmit the wallet identifying data to a central system via a secure connection separate from the direct wireless connection;
in response to transmitting the wallet identifying data:
receive, from the central system and via the secure connection, consumer identifying data that identifies a consumer associated with the wallet identifying data; and
receive, from the central system and via the secure connection, consumer preference data indicative of a preference for a particular employee skill and service level, particular employee identifying data or an employee type;
track employee service availability, employee service availability being indicative of an availability of an employee to assist a consumer;
determine a ranking of employees for the consumer based at least in part on the employee service availability and the consumer preference data;
match the employee payment account associated with a selected employee with the consumer based on the ranking of employees; and
subsequent to matching the employee payment account associated with the selected employee with the consumer, associate employee identifying data that identifies the employee payment account associated with the selected employee with the received consumer identifying data;
a consumer device including processing circuitry configured to:
prior to sending the wallet identifying data to the merchant device, receive the wallet identifying data from the central system;
wirelessly send the wallet identifying data to a merchant device via the direct wireless connection when the consumer device is within the direct wireless communicable range with the merchant device; and
wirelessly receive, via the direct wireless connection, employee profile information of the employee payment account associated with the selected employee associated with the consumer identifying data from the merchant device; and
the central system including a networked device including processing circuitry configured to:
prior to receiving the wallet identifying data from the merchant device, send wallet identifying data to the consumer device;
receive the wallet identifying token sent to the consumer device from the merchant device via the secure connection; and
in response to receiving the wallet identifying token:
send the consumer identifying data associated with the wallet identifying data to the merchant device via the secure connection; and
send the consumer preference data for the particular employee identifying data or employee type to the merchant device via the secure connection.

18. The system of claim 17, wherein:
the processing circuitry of the merchant device is further configured to:
wirelessly receive, from the consumer device, consumer approval data indicating approval of a payment of an employee payment amount to the employee payment account; and
send the consumer approval data to the central system;
the processing circuitry of the consumer device is further configured to wirelessly send the consumer approval data to the merchant device; and
the processing circuitry of the networked device is further configured to:
receive, from the merchant device, the consumer approval data;
validate the consumer approval data; and
process the payment after validating the consumer approval data.

* * * * *